(12) United States Patent
Fukuda

(10) Patent No.: US 7,167,603 B2
(45) Date of Patent: Jan. 23, 2007

(54) IMAGE REQUESTING APPARATUS

(75) Inventor: Yasuo Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 783 days.

(21) Appl. No.: 10/408,565

(22) Filed: Apr. 8, 2003

(65) Prior Publication Data
US 2004/0028294 A1 Feb. 12, 2004

(30) Foreign Application Priority Data
Apr. 11, 2002 (JP) .............................. 2002-109438

(51) Int. Cl.
G06K 9/60 (2006.01)

(52) U.S. Cl. ...................... 382/305; 382/284; 358/450; 348/274

(58) Field of Classification Search ................ 382/282, 382/284, 294, 305; 345/629, 740; 358/540, 358/450; 348/274
See application file for complete search history.

(56) References Cited

U.S. PATENT DOCUMENTS

| | | | | |
|---|---|---|---|---|
| 5,432,542 A | * | 7/1995 | Thibadeau et al. | 725/35 |
| 5,565,909 A | * | 10/1996 | Thibadeau et al. | 725/35 |
| 5,657,402 A | * | 8/1997 | Bender et al. | 382/284 |
| 5,912,720 A | * | 6/1999 | Berger et al. | 351/206 |
| 6,041,143 A | | 3/2000 | Chui et al. | 382/232 |
| 6,205,259 B1 | * | 3/2001 | Komiya et al. | 382/284 |
| 6,345,130 B1 | * | 2/2002 | Dahl | 382/286 |
| 6,351,776 B1 | | 2/2002 | O'Brien et al. | 709/245 |
| 6,501,441 B1 | * | 12/2002 | Ludtke et al. | 345/1.1 |
| 6,546,152 B1 | * | 4/2003 | Hou | 382/284 |
| 6,940,529 B1 | * | 9/2005 | Deering | 345/647 |

FOREIGN PATENT DOCUMENTS

| | | |
|---|---|---|
| JP | 5-40591 | 2/1993 |
| JP | 5-207259 | 8/1993 |
| JP | 6-149523 | 5/1994 |
| JP | 8-251391 | 9/1996 |
| JP | 10-21020 | 1/1998 |
| JP | 2000-267967 | 9/2000 |
| JP | 2001-75846 | 3/2001 |
| JP | 2003-514279 | 4/2003 |

OTHER PUBLICATIONS

Jan. 5, 2006 Japanese Official Action in Japanese Patent Application No. 2002-109438.

* cited by examiner

Primary Examiner—Matthew C. Bella
Assistant Examiner—Yosef Kasssa
(74) Attorney, Agent, or Firm—Fitzpatrick, Cella, Harper & Scinto

(57) ABSTRACT

A client apparatus checks overlap of graphic objects described in multimedia description data. For an image found to be not overlapped with another graphic object, the client apparatus transmits a whole image request for whole image data to a server apparatus. For an image found to be overlapped with another graphic object, the client apparatus determines one or more partial images, and transmits a partial image data request corresponding to each determined partial image. The client apparatus receives the whole image data or partial image data returned from the server apparatus in response to the request, and generates a layout image described by the multimedia description data by using the received whole image data or partial image data.

25 Claims, 23 Drawing Sheets

```
1:  <html>
2:  <head>
3:  <title>Target Page</title>
4:  <style type="text/css">
5:  IMG {
6:      width       4in;
7:      height;     3in;
8:  }
9:  IMG.pic1 {
10:     position:   absolute;
11:     left:       1in;
12:     top:        1in;
13: }
14: IMG.pic2 {
15:     position:   absolute;
16:     left:       2in;
17:     top:        2in;
18: }
19: <style>
20: </head>
21: <body>
22: <img class="pic1"width="160"height="120"src="pic1.jpg">
23: <img class="pic2"width="160"height="120"src="pic2.jpg">
24: </body>
25: </html>
```

FIG. 16

| 1601 | 1602 | 1603 | 1604 | 1605 | 1606 | 1607 |
|------|------|------|------|------|------|------|
| 1608 | 1609 | 1610 | 1611 | 1612 | 1613 | 1614 |
| 1615 | 1616 | 1617 | 1618 | 1619 | 1620 | 1621 |
| 1622 | 1623 | 1624 | 1625 | 1626 | 1627 | 1628 |
| 1629 | 1630 | 1631 | 1632 | 1633 | 1634 | 1635 |

| 0 | 1 | 2 | 3 | 4 | 5 | 6 |
|---|---|---|---|---|---|---|
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | 32 | 33 | 34 |

IMAGE REQUESTING APPARATUS

FIELD OF THE INVENTION

The present invention relates to multimedia description data containing external reference to image data, and a technique of communicating image data to be referred to by the multimedia description data.

BACKGROUND OF THE INVENTION

HTML (Hyper Text Markup Language) mainly used in the World Wide Web system is text data made up of tags surrounded by "<" and ">" and character data. This HTML allows description of multimedia documents containing texts and image data, and has been widely used and developed with the spread of the Internet.

The initial HTML simply laid out text data and image data in the display area of a display program called a browser. With the spread after that, however, the HTML has been extended to express more complicated layouts. This extension is presently organized as style sheets by W3C (World Wide Web Consortium). For example, style sheet standards such as CSS (Cascade Style Sheet) and XSL (Extensible Stylesheet Language) exist.

This W3C also defines XHTML obtained by redefining HTML by XML (Extensible Markup Language).

It is presently possible, by combining HTML/XHTML/XML and style sheets (e.g., CSS), to express layouts which could not be expressed by the initial HTML, e.g., to overlap graphic objects such as character strings, images, and rectangles visualized by using font data.

The W3C further defines various standards such as SMIL and SVG. The former is a multimedia document description system primarily for the purpose of presentation, and has description capability particularly in the time axis direction. The latter is a vector graphics description system and capable of describing more complicated layouts substantially equivalent to PDL (Page Description Language).

Data obtained by any of the above description systems is described in a text data form. For non-text data such as an image, only reference to the image file is described (Hyper Link). To display, e.g., HTML data, a browser first loads the HTML data, and determines and visualizes a layout by analyzing tags. If reference to non-text data such as an image is contained in this HTML, the browser acquires and displays the whole of the image file (or another non-text data) in accordance with the reference contained in the HTML, after or simultaneously with interpretation of the HTML.

This image file is transferred in accordance with a protocol described in a URL (Uniform Resource Locator) designated by the HTML or Hyper Link to the image data. The most general protocol is HTTP (Hyper Text Transfer Protocol). When this HTTP is used, a client designates a virtual path name and file name of a target file on a server, and the server specifies the file entity from the virtual path name and file name designated by the client, and transmits the whole file to the client.

On the other hand, if an image has a Flashpix image format ("Flashpix Specification 1.0", I3A), IIP ("Internet Imaging Protocol version 1.06", Digital Imaging Group) is known as a method of communicating a partial image of the image. The Flashpix image format holds an image at plurality of resolutions (each resolution image has a resolution ½ that of an immediately higher resolution image). In addition, the Flashpix image format segments each resolution image into partial images called tiles each having 64×64 pixels, and holds these images in a file in a form by which each tile image can be accessed. The IIP is a protocol packaged on the HTTP and can acquire a target partial image for each tile by transmitting the URL of a target Flashpix image file, a target resolution image, and the tile identifier of a tile corresponding to a target area in the resolution image.

As described above, the present multimedia data description systems can describe complicated layouts, e.g., a layout in which one graphic object overlaps another graphic object. In this case, data of the overlapped portion of the underlying graphic object has no influence on the layout generated as a result. If the underlying graphic object is an image, the present HTTP acquires even data of a portion not contributing to the final layout. Therefore, if the line speed between the server and client is low or if the communication is charged, the communication time or communication fee undesirably exceeds the originally necessary time or fee.

To prevent this, when creating multimedia data, the author may predict the final layout and form a layout having no overlap by segmenting an image into a plurality of image data in advance. However, this method still has the following problems.

(1) Specifications of the current standards of HTML/XHTML and style sheets are ambiguous and depend on an interpreter (e.g., a browser). Therefore, a layout actually determined by a target interpreter does not match the prediction by the author in some cases.

(2) Conflicts occur if a layout dynamically changes, e.g., if the size of image data to be referred to or an overlying graphic object changes each time, of if an interpreter can dynamically change the layout of graphic objects.

As processing for overlapping of graphic objects as described above, methods described in Japanese Patent Laid-Open Nos. 8-251391 and 10-21020 are known. The former method determines overlapping of image data when PDL interpretation is performed by a page printer or the like. If a graphic object overlaps an image object, the image is segmented, and image data in a portion covered with the other graphic object is deleted, thereby saving the memory. The latter method deletes a graphic object instruction completely covered with another graphic object, thereby reducing the load of a subsequent drawing process. Unfortunately, either processing is performed after graphic object data (image data if the object is an image) to be deleted is received, and hence does not contribute to reduction of the communication time described above.

SUMMARY OF THE INVENTION

The present invention has been made to solve the above problems, and has as its object to reduce the communication amount and communication time by neither transmitting nor receiving image data of an overlapped portion of one of a plurality of images and another image.

To achieve the above object, according to an aspect of the present invention, there is provided an image requesting apparatus comprising:

determining means for determining overlapping of one of a plurality of images and another image; and transmitting means for transmitting, to an image storage device, a first request for requesting image data corresponding to an image found to be not overlapped with the another image by the determining means, and transmitting, to the image storage device, a second request for requesting partial image data corresponding to not less than one partial image of an image found to be overlapped with the another image.

According to another aspect of the present invention, there is provided a program for allowing a computer to execute steps of an image requesting method, the image requesting method comprising:

an overlap determination step of determining overlap of a plurality of images and another image;

a transmission step of transmitting, to an image storage device, a first request for requesting image data corresponding to an image found to be not overlapped with the another image by the determining means, and transmitting, to the image storage device, a second request for requesting partial image data corresponding to not less than one partial image of an image found to be overlapped with the another image.

According to still another aspect of the present invention, there is provided an image communication system in which a server apparatus holding a plurality of images and a client apparatus communicate with each other via a communication path, comprising:

the server apparatus comprising:

image transmitting means for receiving a request for image data corresponding to an image or partial image data corresponding to a partial image, and transmitting the image data or partial image data requested in response to the request, and the client apparatus comprising:

overlap determining means for determining overlapping of one of a plurality of images and another image;

transmitting means for transmitting, to an image storage device, a first request for requesting image data corresponding to an image found to be not overlapped with the another image by the determining means, and transmitting, to the image storage device, a second request for requesting partial image data corresponding to not less than one partial image of an image found to be overlapped with the another image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view showing an example of HTML data held in a storage device 203;

FIG. 16 is a view showing tile segmentation according to the third embodiment;

FIG. 20 is a view for explaining the correspondence between tile number ranges and tiles;

DETAILED DESCRIPTION OF THE PREFERRED EMBODIMENTS

Preferred embodiments of the present invention will now be described in detail in accordance with the accompanying drawings.

First Embodiment

Figure 1:
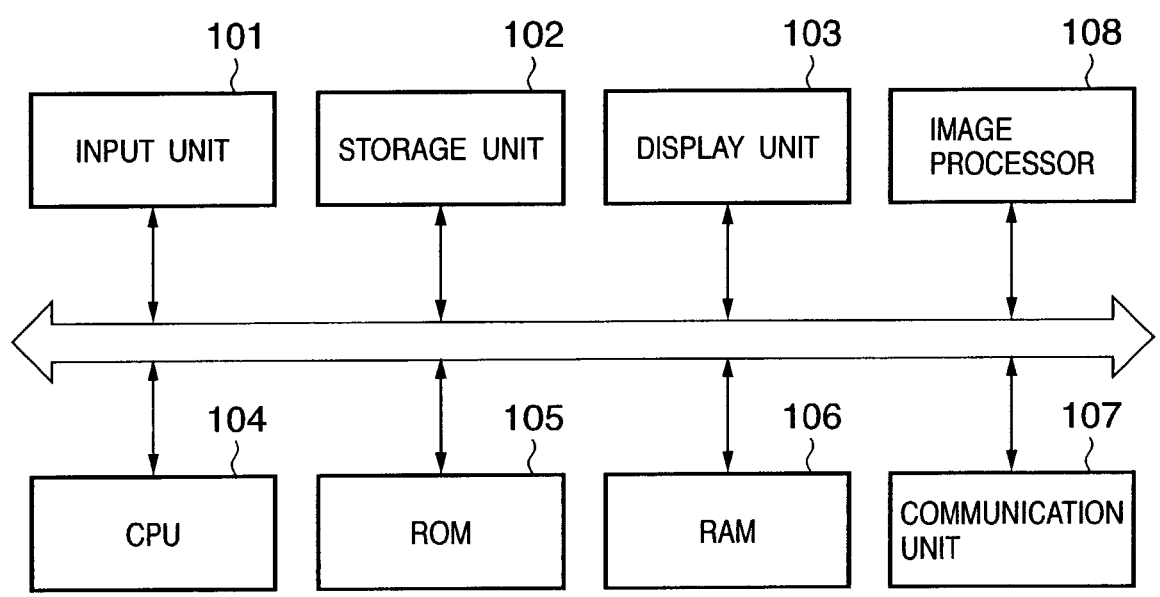
FIG. 1 is a block diagram showing the arrangement of an image communication apparatus forming an image communication system.

FIG. 1 is a block diagram showing the arrangement of an image communication apparatus forming an image communication system. An input unit 101 shown in FIG. 1 is a device for inputting instructions and data from a user, and includes a keyboard, pointing device, and the like. Examples of the pointing device are a mouse, trackball, track pad, and tablet. When this apparatus is applied to a well-known digital camera, the input unit 101 can be a button, mode dial, or the like.

A storage unit 102 is a portion for holding data and is usually a hard disk, flexible disk, CD-ROM, CD-R, memory card, CF card, smart medium, SD card, memory stick, or the like. Programs and some other data can also be stored in the storage unit 102.

A communication unit 107 controls communications between a modem and general line and communications with a network such as a LAN. The communication system can be an arbitrary system, e.g., a wire communication system such as well-known USB, IEEE1284, or IEEE1394, or a wireless communication system such as infrared radiation, IEEE802.11b, IEEE802.11a, or Bluetooth. The communication unit 107 is a device for controlling these communication paths.

A display unit 103 is a device for displaying images such as GUI (Graphical User Interface). Generally, a CRT or liquid crystal display is used. It is also possible to use an external display device connected to the apparatus by a cable or the like. Alternatively, a well-known printing device may also be used.

A CPU 104 controls the entire apparatus and takes part in all the processes performed by the units described above. A ROM 105 and RAM 106 provide the CPU 104 with, e.g., programs, data, and a work area required for processing. If control programs necessary for processes to be described later are stored in the storage unit 102 or ROM 105, these programs are once loaded into the RAM 106 and then executed.

An image processor 108 performs, e.g., an image compression/expansion process or image correction process. These processes may also be implemented by executing programs stored in the ROM 105 or storage unit 102 by the CPU 104. In this case, the image processor 108 can be omitted. Alternatively, these processes may be implemented by cooperation of the CPU 104 and image processor 108.

Although not shown, it is also possible to use an image input means such as a well-known CCD to input and store images in the storage unit 102.

Note that the system configuration further includes various constituent elements in addition to those described above. However, these constituent elements are not the principal object of the present invention, so a detailed explanation thereof will be omitted.

The configuration and operation of an image communication system according to the first embodiment will be described below.

Figure 2:
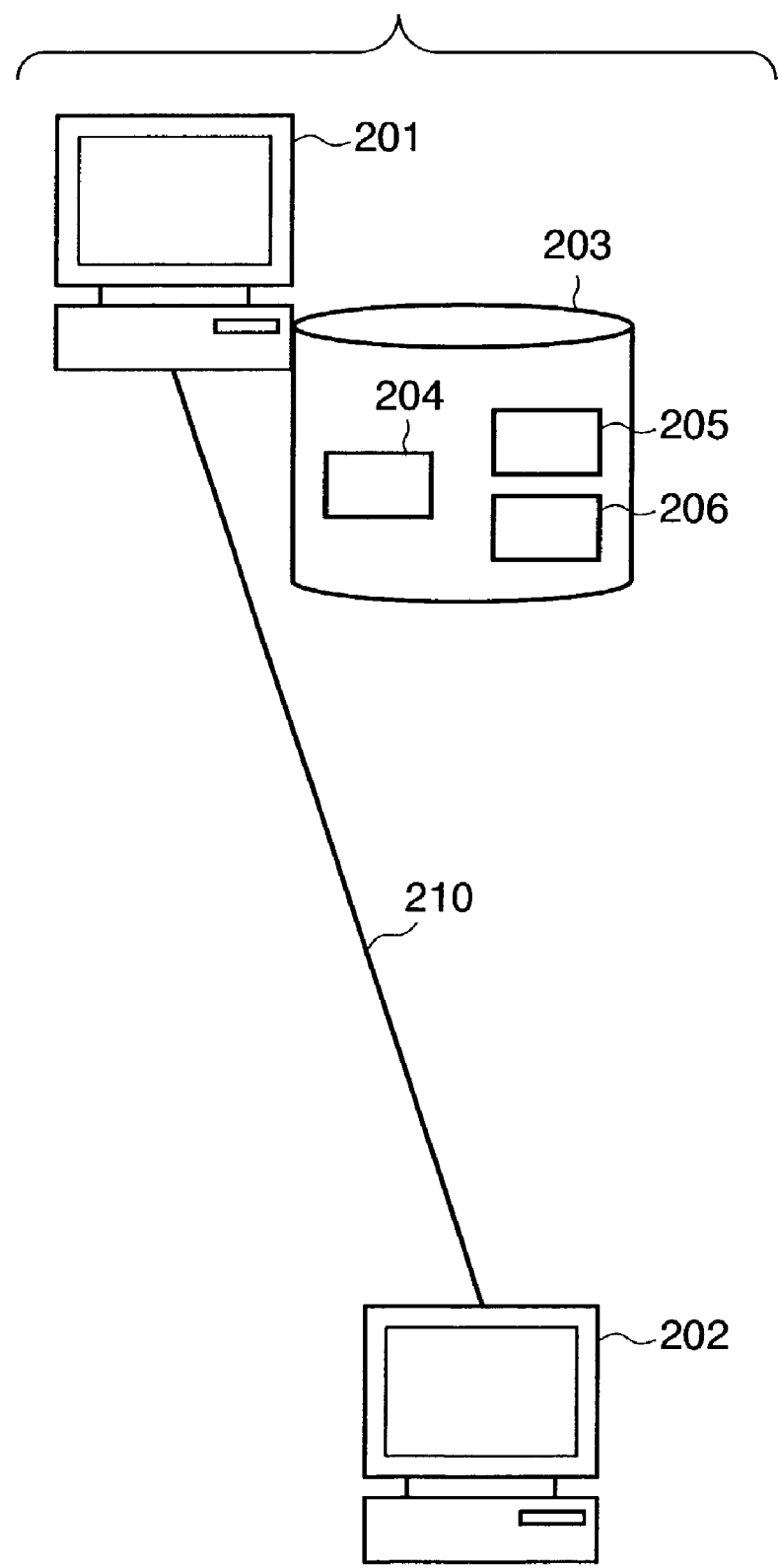
FIG. 2 is a view showing an example of the configuration of an image communication system according to the first embodiment.

FIG. 2 is a view showing an example of the configuration of the image communication system according to the first embodiment. Referring to FIG. 2, image communication apparatuses 201 and 202 are connected via a communication path 210. Each of the image communication apparatuses 201 and 202 has the arrangement as shown in FIG. 1.

In the first embodiment, the image communication apparatus 201 is a server apparatus (also called a "server" hereinafter), and the image communication apparatus 202 is a client apparatus (also called a "client" hereinafter) which is operated by a user.

For the sake of descriptive simplicity, an explanation will be made under the following conditions.

Multimedia data description forms are HTML and CSS.

An http server program for receiving an http request is running on the server 201 and can receive an http request from the client 202.

The server 201 can receive and interpret a partial image request from the client 202, generate a partial image from the designated image, and return the partial image to the client 202. Details will be described later.

The client 202 can transmit a partial image request to the server 201, receive a partial image returned by the server 201 in response to the request, and lay out the received image. Details will be described later.

On the client 201, an HTML interpreter program (browser) for receiving, interpreting, and displaying HTML as a multimedia data description form is running (not shown). In this state, the user inputs to the browser program a URL which designates target multimedia contents in the server 201. On the basis of the URL designated by the user, the browser program transmits an HTTP request to the server 201.

The server 201 has a storage device 203 including the RAM 106 and storage unit 102 shown in FIG. 1. The storage device 203 holds image data 204 identified by pic1.jpg, image data 205 identified by pic2.jpg, and HTML data 206 identified by /path/to/data.html. An HTTP server program (not shown) is running on the server 201.

FIG. 3 is a view showing an example of HTML data held in the storage device 203. In HTML data 301 shown in FIG. 3, a line number is added to the head of each line for the sake of descriptive convenience. However, no such line numbers are necessary for actual HTML data. The structure of the HTML data 301 is as follows.

1st line: An <html> tag indicating the start of an HTML document

2nd line: A <head> tag indicating the start of a header field of the HTML document 3rd line: The title of the HTML document and a <title> tag indicating the title 4th line–19th line: A style sheet data field 20th line: A </head> tag indicating the end of the header field of the HTML document 21st line: A <body> tag indicating the start of a body field of the HTML document 22nd line: An <img> tag indicating embedding of image data 23rd line: An <img> tag indicating embedding of image data 24th line: A </body> tag indicating the end of the body field of the HTML document 25th line: An </html> tag indicating the end of the HTML document The <img> tags indicating embedding of image data on the 22nd and 23rd lines of the HTML data 301 will be explained below.

The <img> tag on the 22nd line has the following attributes:

class="pic1" indicates that a style sheet (to be described later) whose class attribute value is pic1 is applied.

src="pic1.jpg" indicates that this tag refers to a file pic1.jpg.

width="160" and height="120" indicate that the image referred to by this tag, i.e., the image pic1.jpg indicated by the src attribute has a width of 160 pixels and a height of 120 pixels, respectively.

The <img> tag on the 23rd line has the following attributes:

class="pic2" indicates that a style sheet (to be described later) whose class attribute value is pic2 is applied.

src="pic2.jpg" indicates that this tag refers to a file pic2.jpg.

width="160" and height="120" indicate that the image referred to by this tag, i.e., the image pic2.jpg indicated by the src attribute has a width of 160 pixels and a height of 120 pixels, respectively.

The style sheet field on the 4th to 19th lines will be explained below.

In this style sheet field, three rule sets are described. That is, these three rule sets are written on the 5th to 8th lines, 9th to 13th lines, and 14th to 18th lines.

Rule Set on 5th to 8th Lines: (to be Referred as Rule Set 1 Hereinafter)

"IMG" on the 5th line indicates that a rule written in subsequent "{" (5th line) to "}" (8th line) is applied to the <img> tags of the HTML data after the <body> tag. The 6th line indicates that the images referred to by the <img> tags are to be laid out as rectangular regions four inches in width ("width: 4 in;" on the 6th line) and three inches in height ("height: 3 in;" on the 7th line).

Rule Set on 9th to 13th Lines: (to be Referred to as Rule Set 2 Hereinafter)

"IMG.pic1" on the 9th line indicates that a rule written in subsequent "{" (10th line) to "}" (13th line) is applied to the HTML <img> tag having a class attribute of pic1. The 10th line which follows declares that the position of the image referred to by the <img> tag is designated by an absolute position with respect to a region from a tag as a parent element. In addition, the 11th and 12th lines indicate that the position is one inch above ("top: 1 in;" on the 12th line) and one inch away to the left ("left: 1 in;" on the 11th line) from the tag as a parent element.

Rule Set on 14th to 18th Lines: (to be Referred to as Rule Set 3 Hereinafter)

"IMG.pic2" on the 14th line indicates that a rule written in subsequent "{" (14th line) to "}" (18th line) is applied to the HTML <img> tag having a class attribute of pic2. The 15th line which follows declares that the position of the image referred to by the <img> tag is designated by an absolute position with respect to a region from a tag as a parent element. In addition, the 16th and 17th lines indicate that the position is two inches above ("top: 2 in;" on the 17th line) and two inches away to the left ("left: 2 in;" on the 16th line) from the tag as a parent element.

Accordingly, rule set 1 and rule set 2 are applied to the image referred to by the <img> tag on the 22nd line, i.e., to the layout of pic1.jpg, and rule set 1 and rule set 3 are applied to the layout of pic2.jpg of the image referred to by the <img> tag on the 23rd line. As a result, pic1.jpg and pic2.jpg are processed as follows.

pic1.jpg: a 160×120-pixel image is laid out by a size of 4×3 inches in a position one inch below and one inch away to the right from the parent element (<body> tag).

pic2.jpg: a 160×120-pixel image is laid out by a size of 4×3 inches in a position two inches below and two inches away to the right from the parent element (<body> tag).

Figure 4:
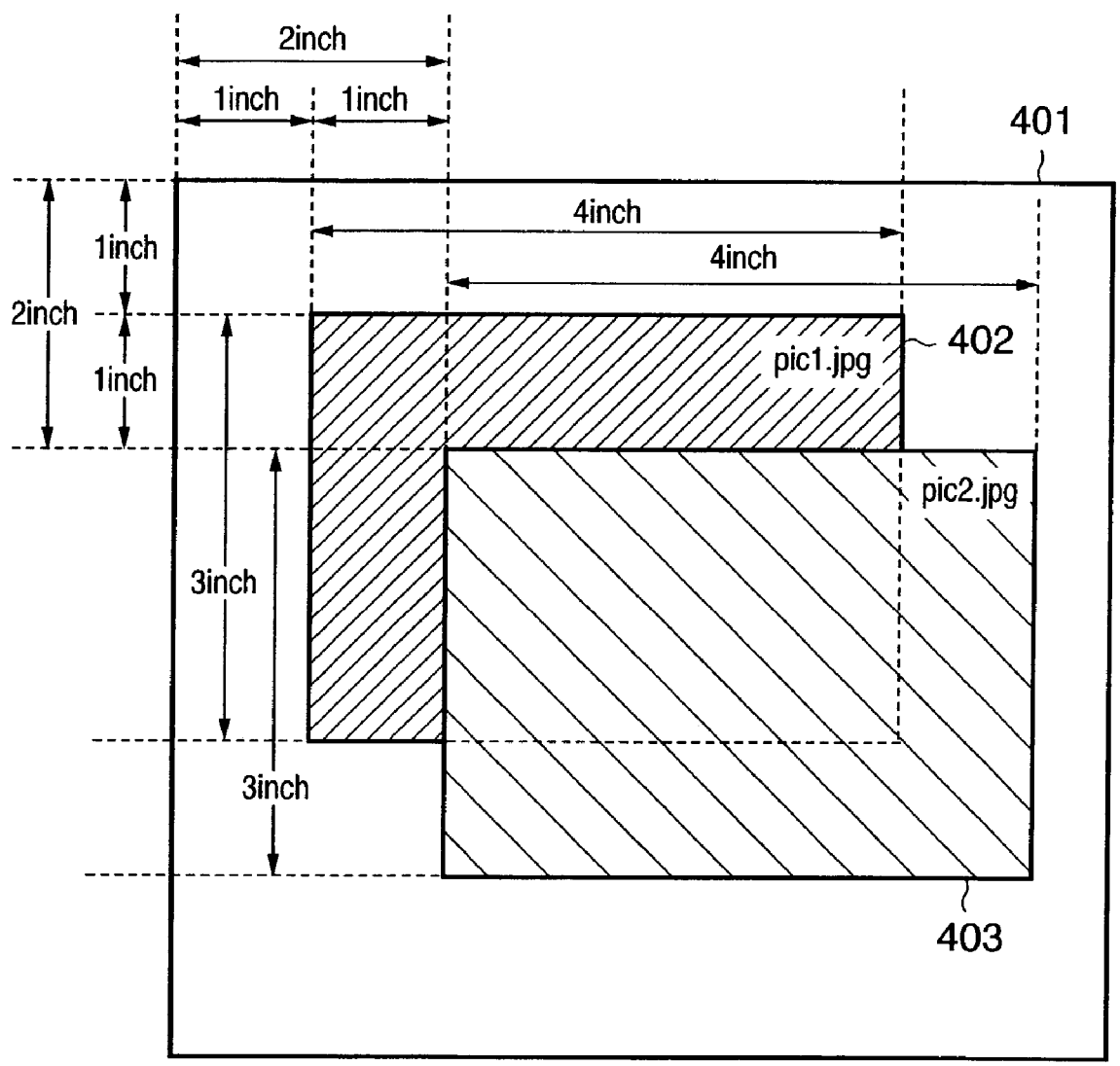
FIG. 4 is a view showing a layout example of HTML data 301.

FIG. 4 is a view showing an example of the layout of the HTML data 301. In FIG. 4, reference numeral 401 denotes a browser's display region; 402, a rectangular region occupied by pic1.jpg; and 403, a rectangular region occupied by pic2.jpg. In this example shown in FIG. 4, a portion of pic1.jpg is laid out underneath pic2.jpg. In this example, the processing is performed following the procedure by which pic1.jpg is drawn first and then pic2.jpg is drawn, because in the HTML data 301 the <img> tag which refers to pic1.jpg is described before the <img> tag which refers to pic2.jpg. Depending on a packaged HTML interpreter (e.g., a browser), therefore, pic2.jpg may be partially covered with pic1.jpg.

To avoid this, for example, a z-index attribute may be clearly designated in each <img> tag. However, since this z-index attribute is not a mandatory attribute, ambiguity sometimes remains if the attribute is not designated. Also, an HTML layout has other ambiguities resulting from portions depending on an HTML interpreter and implicit values. Therefore, the final layout is unknown until a target HTML interpreter interprets HTML data as an object.

In the first embodiment, assume that a browser running on the client 202 interprets the HTML data 301 shown in FIG. 3 and determines the layout as shown in FIG. 4.

Figure 5:
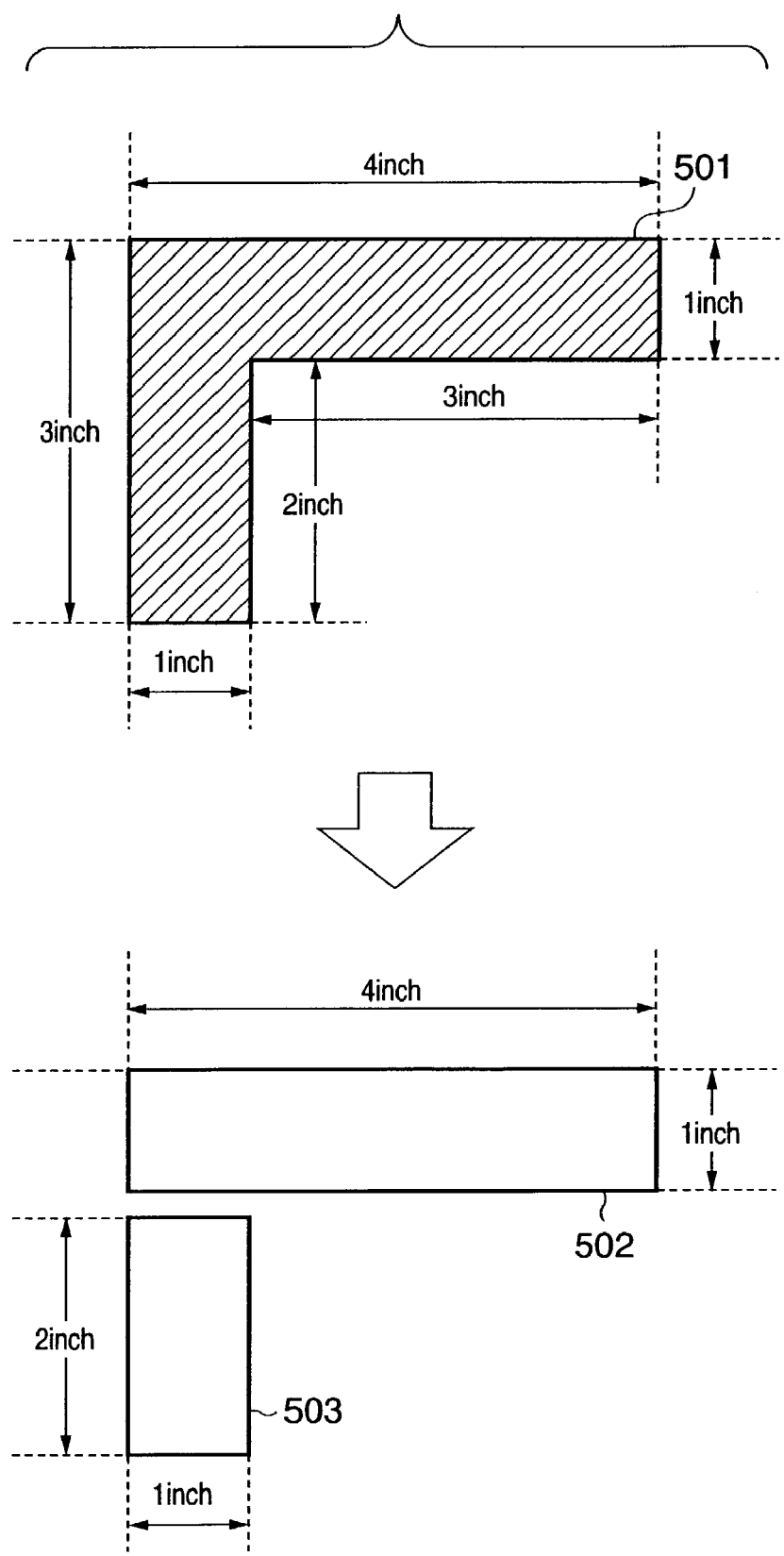
FIG. 5 is a view showing a necessary image region as a result of layout, and examples of segmented rectangles of the image region.

FIG. 5 is a view showing a necessary image region as a result of layout, and examples of rectangular segmented regions of this image region. Reference numeral 501 in FIG. 5 denotes that portion of the rectangular region 402 shown in FIG. 4, which is not covered with the rectangular region 403. Referring to FIG. 5, reference numerals 502 and 503 denote rectangular regions obtained by segmenting the region 501. The region 501 shown in FIG. 5 can be completely segmented into rectangular regions when it is split once, as indicated by the regions 502 and 503. However, it is unnecessary to limit the number of segmented regions to a minimum necessary number, so these segmented regions may be further segmented into smaller rectangular regions.

Figure 6:
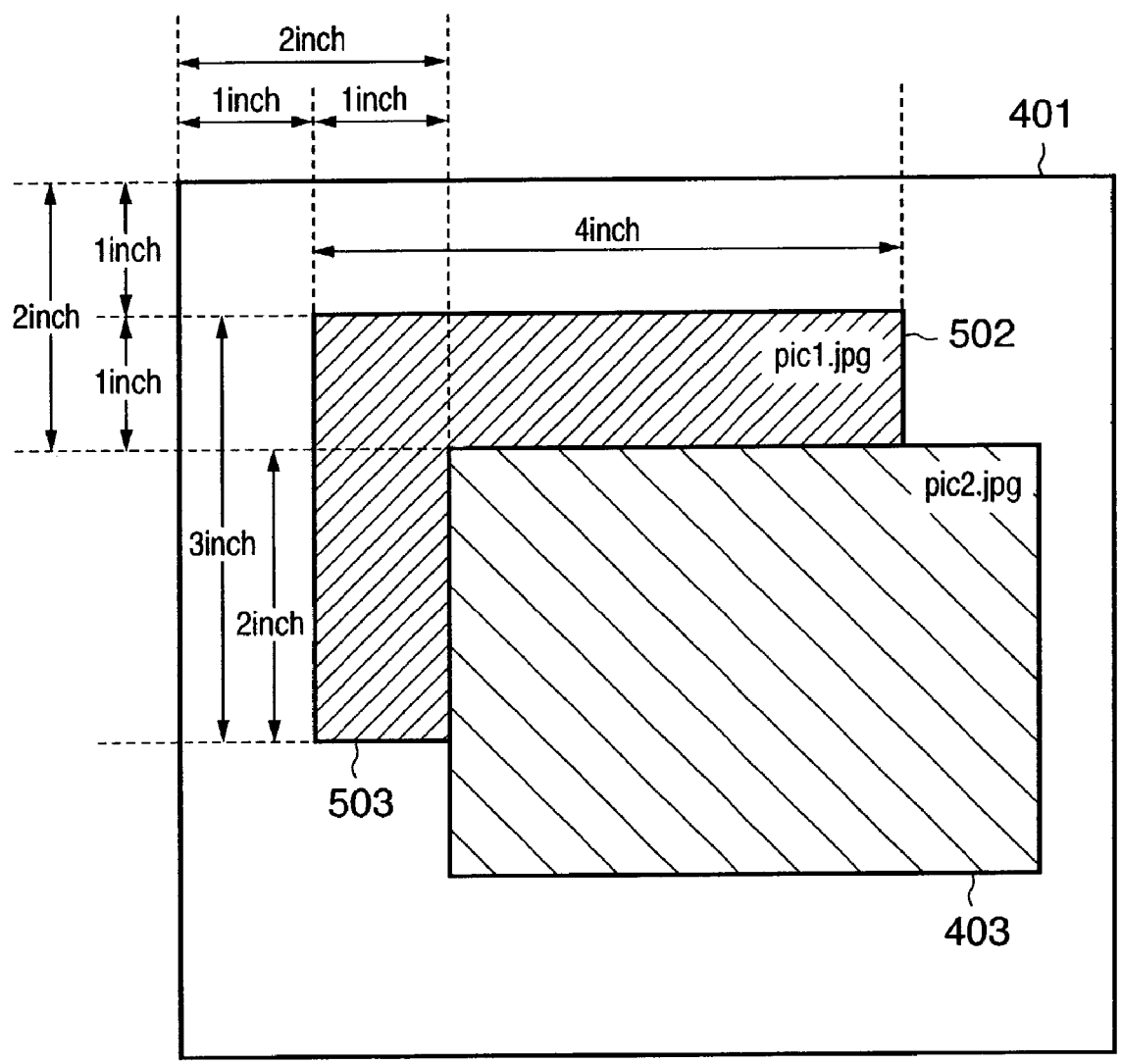
FIG. 6 is a view showing the state in which the same layout as in FIG. 4 is formed by using rectangular regions 502 and 503 shown in FIG. 5 instead of 402 in FIG. 4.

FIG. 6 is a view showing the state in which the same layout as in FIG. 4 is formed by using the rectangular regions 502 and 503 shown in FIG. 5 instead of 402 in FIG. 4. As shown in FIG. 6, a layout can be formed by using rectangular segmented regions.

A method of calculating those sizes and positions of partial regions of pic1.jpg, which are necessary to display the rectangular regions 502 and 503 will be explained below.

Figure 7:
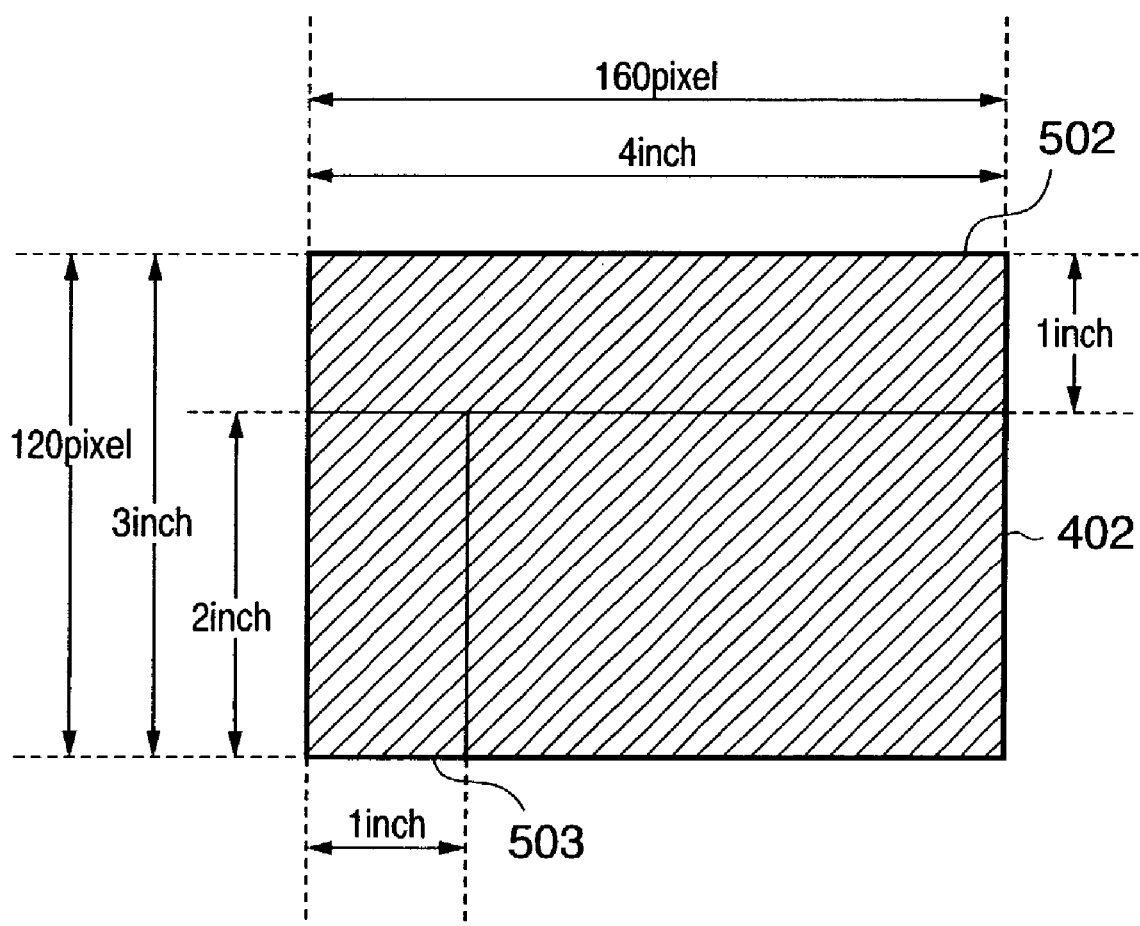
FIG. 7 is a view showing the sizes and positions of the regions 502 and 503 with respect to the original layout region 402 of an image pic1.jpg.

FIG. 7 is a view showing the sizes and positions of the regions 502 and 503 with respect to the original layout region 402 of the image pic1.jpg. The region 402 has a size of 4×3 inches, and the corresponding image pic1.jpg has 160×120 pixels.

Accordingly, those sizes of partial regions in the image pic1.jpg, which correspond to the regions 502 and 503 are as follows.

Figure 8:
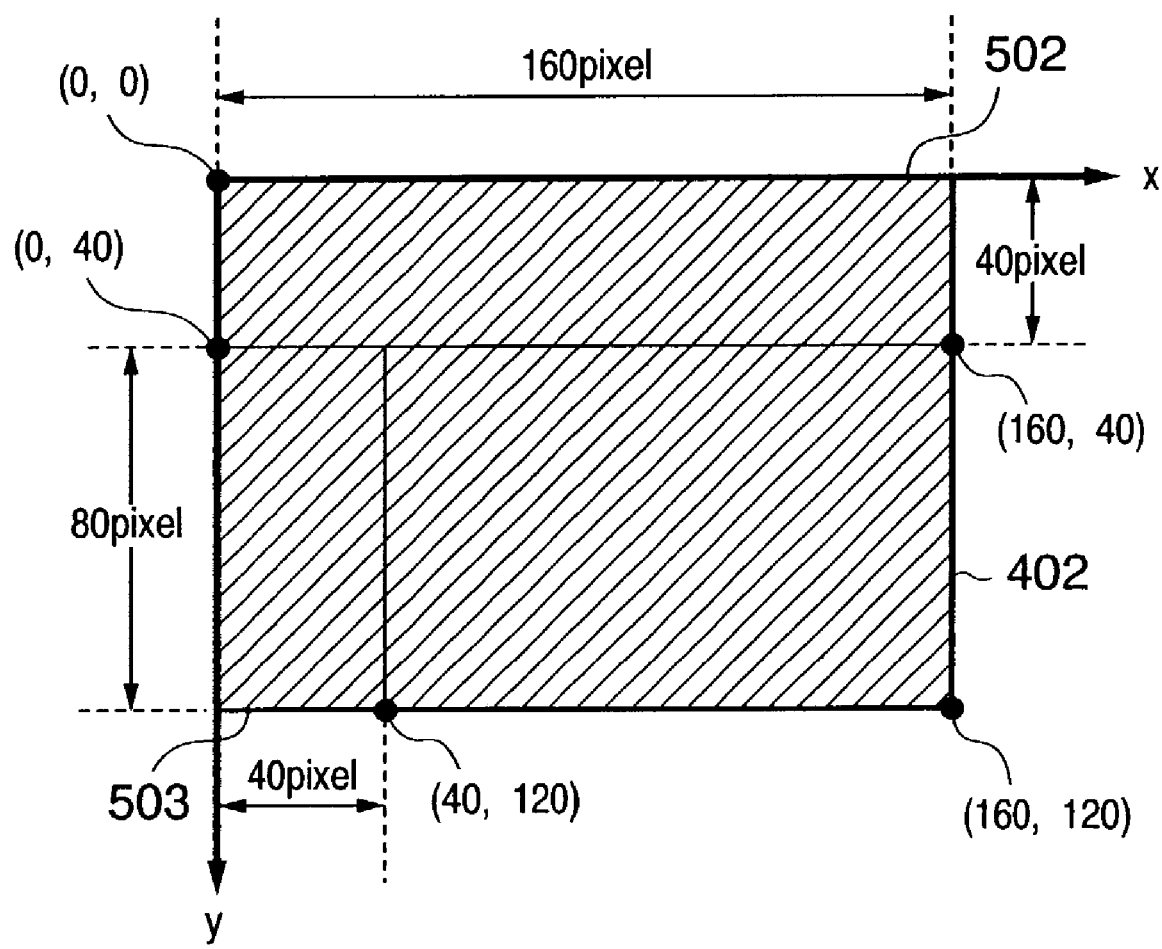
FIG. 8 is a view showing the positions and sizes of the rectangular segmented regions shown in FIG. 5, in a coordinate system based on the original image.

Region 502
Width: 160 pixels
Height: 120 pixels×(1 inch/3 inches)=40 pixels
Region 503
Width: 160 pixels×(1 inch/4 inches)=40 pixels
Height: 120 pixels×(2 inches/3 inches)=80 pixels FIG. 8 is a view showing the regions 402, 502, and 503 in a coordinate system in which the upper left point of pic1.jpg is the origin (0,0), x-coordinates are defined rightward in the horizontal direction for individual pixels, and y-coordinates are defined downward in the vertical direction for individual pixels. That is, the regions 502 and 503 shown in FIG. 8 are as follows.

Region 502: A rectangular region having (0,0) of pic1.jpg as its upper left apex, and (160,40) as its lower right apex
Region 503: A rectangular region having (0,40) of pic1.jpg as its upper left apex, and (40,120) as its lower right apex The processing of the HTML interpreter program (browser) running on the image communication apparatus 202 (client 202) of the image communication system according to the first embodiment will be described below.

Figure 9:
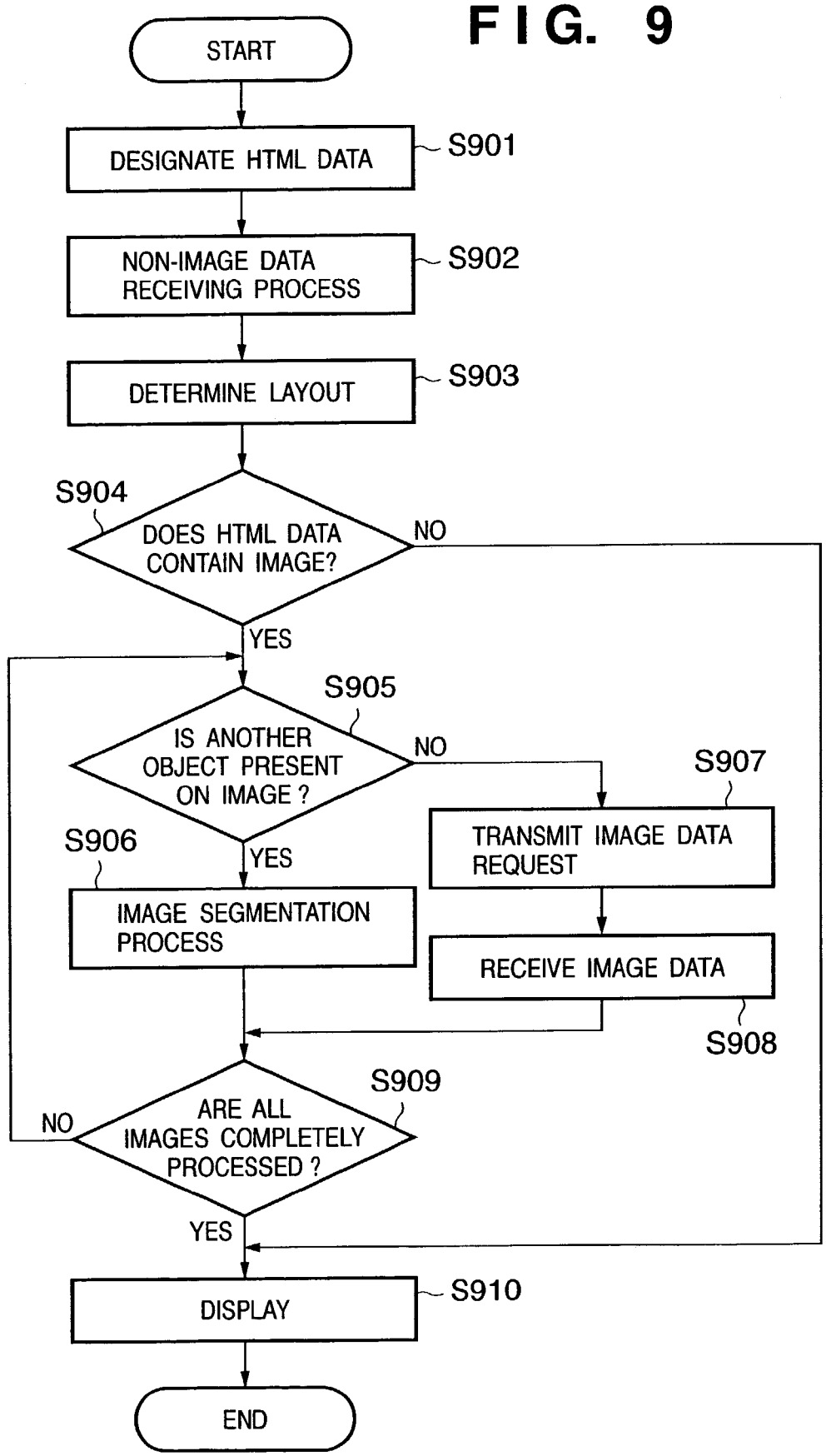
FIG. 9 is a flow chart showing processing on a client 202.

FIG. 9 is a flow chart showing the processing of the client 202. First, a user operates the input unit 101 of the client 202 to input a URL representing desired HTML data, and instructs the browser program to start the processing (step S901). On the basis of the designated URL representing the HTML data, the browser program performs a non-image data receiving process (step S902).

Figure 10:
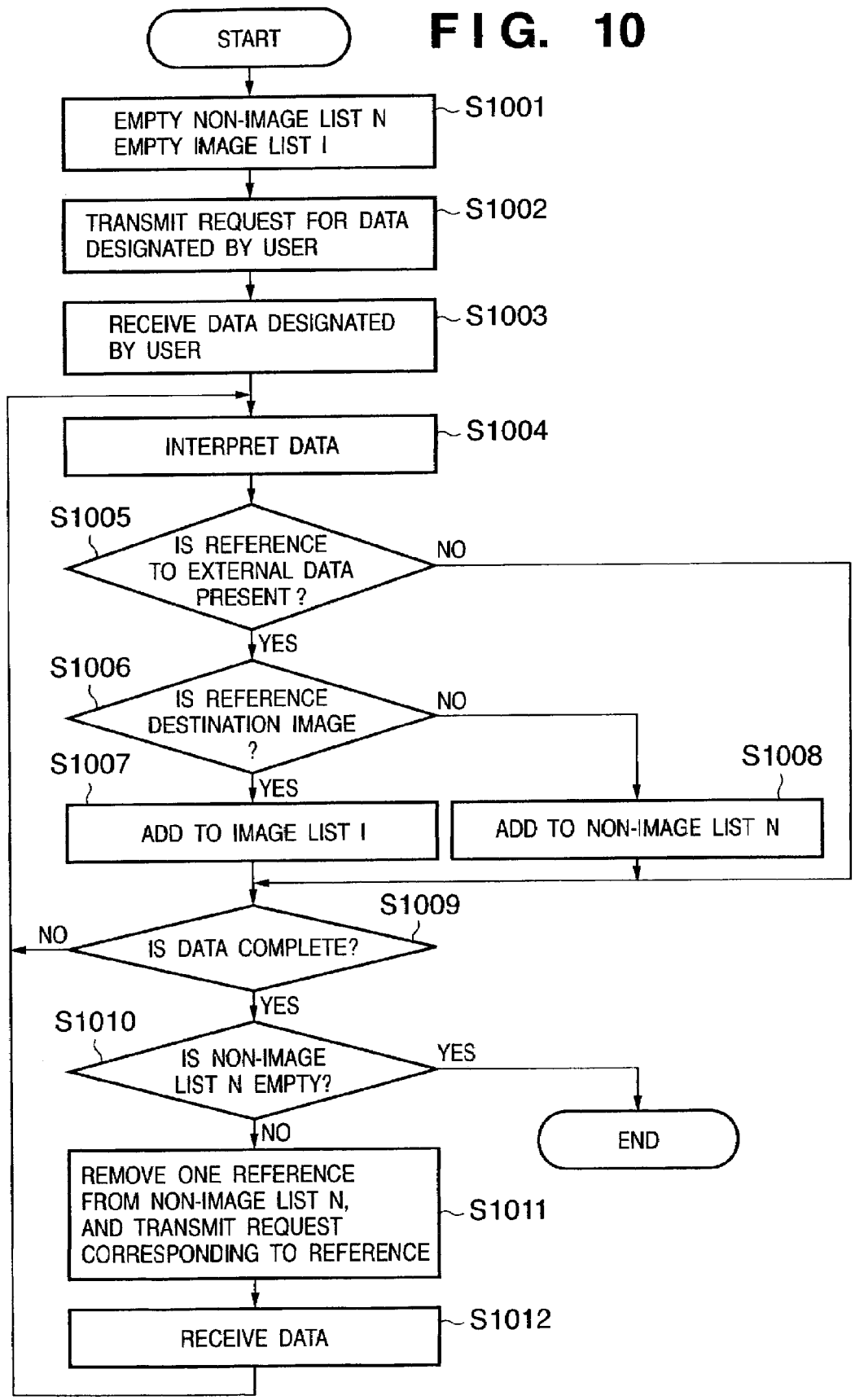
FIG. 10 is a flow chart showing a non-image data receiving process shown in FIG. 9.

FIG. 10 is a flow chart showing the non-image data receiving process in FIG. 9. In this non-image data receiving process, in step S1001, two data for storing external reference contained in the data, i.e., a non-image list N and image list I are emptied, thereby performing initialization. As a list variable for storing external reference obtained by analyzing HTML data or CSS data, this processing uses two list variables in order to separately store reference to an image and reference to data other than an image.

In step S1002, the browser program forms a request from the URL designated by the user in step S901, and transmits the request to the server 201.

Figure 11:
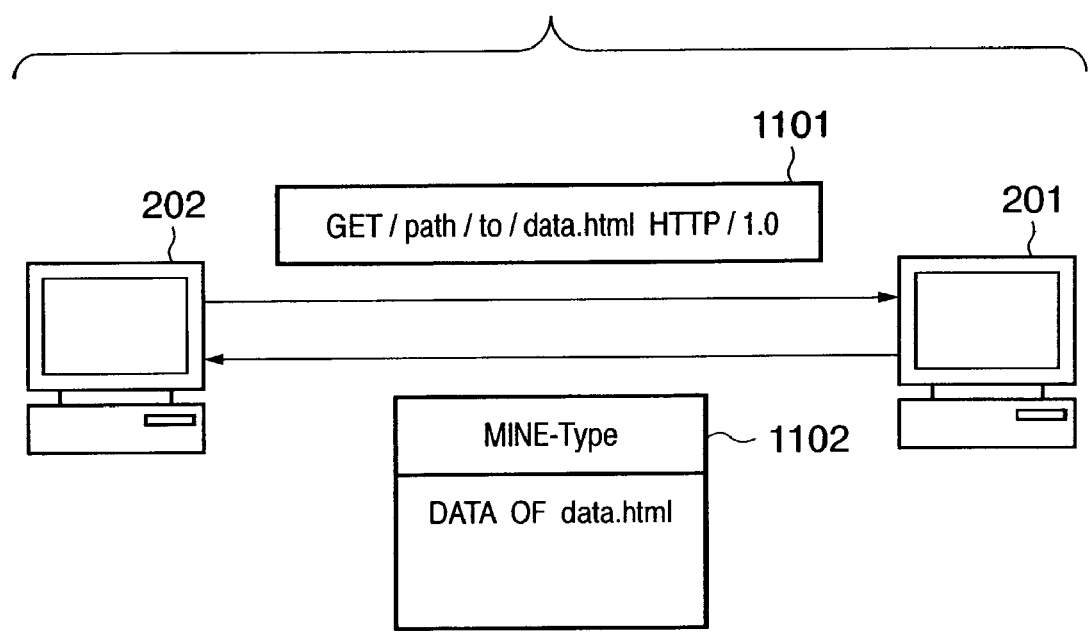
FIG. 11 is a view for explaining a communication procedure between a client and server.

FIG. 11 is a view for explaining the communication procedure between the client and server. In this embodiment, a TCP/IP connection is constructed on the communication path, the client 202 connects to the server 201 via a predetermined http service port (e.g., No. 80), and a request 1101 for requesting desired data (e.g., HTML data) is transmitted. The request 1101 is made up of "GET" (command), "/path/to/data.html" (data's path and identifier), "HTTP/1.0" (protocol version), and the like.

The server 201 analyzes the request 1101 transmitted from the client 202, and returns the requested data as a response 1102 to the client 202. The response 1102 is formed by connecting MIME-Type representing the data type and actual data. Note that the processing on the server 201 will be described later.

Referring back to FIG. 10, in step S1003, the client 202 receives the response 1102 from the server 201. The response data received by the client 202 is saved in the RAM 106 or storage unit 102 of the client 202. In this embodiment, assume that the client 202 receives the response 1102 containing the HTML data 301 shown in FIG. 3.

Then, the client 202 interprets the data by referring to the data field of the response from the server 201 (step S1004). For example, if the data is HTML data, the client 202 loads and interprets one tag. By interpreting the data, the client 202 can determine whether the data contains reference to another data, e.g., another HTML (e.g., a frame function), external reference CSS, image data, or sound data.

In step S1005, the flow branches in accordance with whether the result of interpretation in step S1004 indicates that there is external reference. If there is no external reference, the flow advances to step S1009; if there is external reference, the flow advances to step S1006.

In step S1006, whether the external reference is an image is checked, and the flow branches accordingly. Whether the referred data is an image can be checked in accordance with by which attribute of which tag of which HTML the data is referred to, or by which element of CSS the data is designated. For example, it can be determined that the following attributes and element are reference to image data.
src attribute and lowsrc attribute of <img> tag
background attribute of <body> tag
background-image:element of CSS It is also possible to refer to the extension of a file in the link destination. If the extension indicates an image such as JPG, GIF, or PNG, it is determined that the external reference is an image; if not, it is determined that the external reference is not an image.

If the referred data is an image, the flow advances to step S1007, and this reference is added to the image list I. If the referred data is not an image, the flow advances to step S1008, and the reference is added to the non-image list N.

In step S1009, whether the present data of interest is complete is checked. If the data of interest is HTML, the end of the data can be determined when a tag </html> is found or by detecting the end (EOF) of the file in which this data is stored. If the data is not complete, the flow returns to step S1004 to repeat the above process.

If the data is complete in step S1009, the flow advances to step S1010 to check whether the non-image list N is empty. If the non-image list N is empty, all the data necessary to display the HTML data initially designated by the user is compete except for an image, so the processing is terminated. If the non-image list N is not empty, the flow advances to step S1011. In step S1011, one reference is extracted and thereby deleted from the non-image list N, and, on the basis of this extracted reference, a request is transmitted to the server 201 in the same manner as in step S1002. In step S1012, as in step S1003, the client 202 receives the response 1102 from the server 201 and saves the data in the RAM 106 or storage unit 102, and the flow returns to step S1004. The above processing is repeated until the non-image list N is emptied.

As a result of the processing shown in FIG. 10, all the data required to display the HTML data designated by the user is received except for an image, and held in the RAM 106 or storage unit 102. On the other hand, the reference to image data is stored in the image list I.

Referring back to FIG. 9, after the non-image data receiving process in step S902 explained above, in step S903 the layout of the HTML data is determined by using the non-image data received and held in step S902. Although the image data is not present on the client 202, the layout can be determined if the region is designated by the style sheet field as in the HTML data 301 shown in FIG. 3.

In step S904, whether the HTML data designated by the user contains an external reference image is checked. This can be done by checking whether the image list I used in the explanation of FIG. 10 is empty. If the image list I is empty, this HTML data designated by the user contains no image, so the flow advances to step S910.

If the image list I is not empty, the flow advances to step S906 to check overlapping of the image portion. In this process, it is checked on the basis of the layout determined in step S903 whether each image data indicated by the reference stored in the image list I overlaps another graphic object. This overlap check can be performed by any well-known method. More specifically, overlapping can be simply checked from the position, size, and drawing order of an assumed circumscribed rectangle of each graphic object.

If it is determined in step S905 that there is no overlapping because no other object is present on the image, the flow advances to step S907. If overlapping is found, the flow advances to step S906 to perform an image segmentation process.

Figure 12:
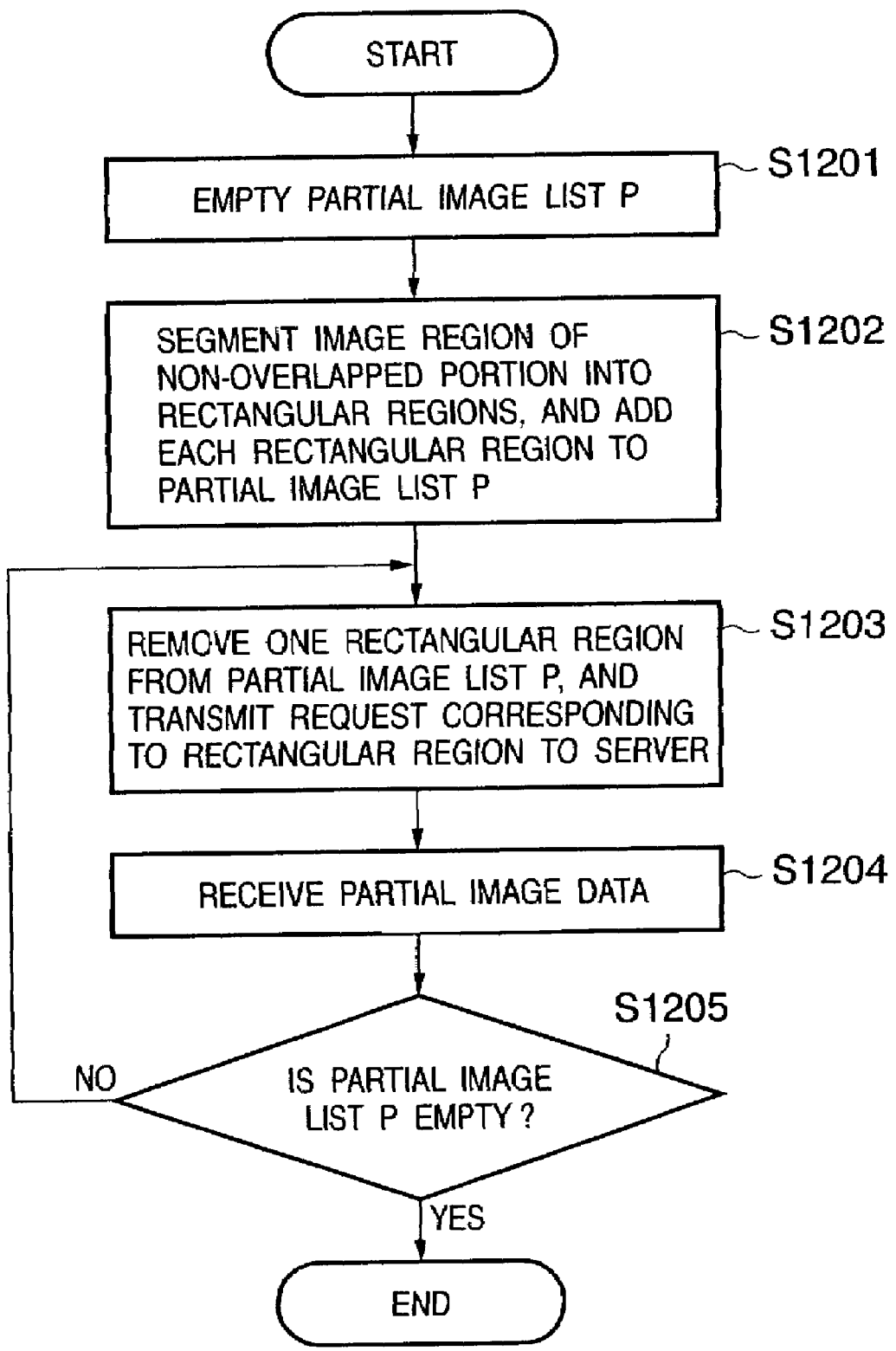
FIG. 12 is a flow chart showing an image segmentation process shown in FIG. 9.

FIG. 12 is a flow chart showing the image segmentation process shown in FIG. 9. First, in step S1201, list variables for storing segmented rectangular partial image regions and a partial image list P are emptied, thereby performing initialization. The partial image list P stores a pair of an identifier and information presented below for each partial image.
The identifier (file name) of an image before segmentation
Information (e.g., coordinate values) representing a rectangular region In step S1202, as already explained with reference to FIGS. 4 to 8, a non-overlapped portion of the overlapped underlying image is detected, and this region is divided into rectangles.

In this embodiment, the following rectangular regions are obtained as the partial regions 502 and 503 from the HTML data shown in FIG. 3 by the processing already explained with reference to FIGS. 4 to 8. Information pertaining to these regions is added to the partial image list P.
Region 502: A rectangular region having (0,0) of pic1.jpg as the upper left apex, and (160,40) as the lower right apex
Region 503: A rectangular region having (0,40) of pic2.jpg as the upper left apex, and (40,120) as the lower right apex In step S1203, one piece of partial image information is extracted and thereby deleted from the partial image list P, and a request corresponding to the extracted partial image information is generated and transmitted to the server 201. The form of the request can be any arbitrary form as long as it contains pic1.jpg indicating the image and information representing the size of the rectangular region. In this embodiment, the request form contains the coordinate values of the upper left point and lower right point of the rectangular region in the coordinate system shown in FIG. 8.

More specifically,
"GET pic1.jpg?left=0&top=0&bottom=40&right=160 HTTP/41.0"
is generated for the region 502, and
"GET pic1.jpg?left=0&top=40&bottom=120&right=40 HTTP/1.0"

is generated for the region 503. That is, a request is formed by giving "?" after the file name and connecting data "keyword=value" by "&", and transmitted to the server 201.

The purpose of the present invention can also be achieved by transmitting the coordinates of one apex of the rectangular region and information concerning the width and height of the region. Furthermore, it is possible to form a coordinate system by normalizing the coordinate system shown in FIG. 8 by using one of the width and height of an image, or to form a coordinate system by normalizing the horizontal direction and vertical direction independently of each other by using the width and height of an image. The purpose of the present invention can be achieved by using coordinate values in one of these coordinate systems.

The server 201 receives and interprets this request, extracts image data corresponding to the partial region, and returns the data to the client 202. This processing on the server 201 will be described in detail later.

The client 202 receives the partial image data as a response from the server 201, and saves the data in the RAM 106 or storage unit 102 (step S1204). In step S1205, the client 202 checks whether the partial image list P is empty. If the partial list P is empty, this means that all the partial image data of the segmented rectangles is completely received, so this processing is terminated. If the partial list P is not empty, the flow returns to step S1203, and requests for remaining rectangular regions are transmitted to the server 201.

Referring back to FIG. 9 again, steps S907 and S908 are performed when an image must be entirely received without being segmented. In steps S907 and S908, as explained in steps S1002 and S1003 or S1011 and S1012 shown in FIG. 10, a request is transmitted to the server 201, a response is received from the server 201, and the data is stored in the RAM 106 or storage unit 102. Therefore, a detailed explanation thereof will be omitted.

Next, in step S909, whether all the images are completely processed is checked. In this process, whether the image list I shown in FIG. 10 is empty is checked. If the image list I is empty, this means that all the images are completely processed, so the flow advances to step S910. If the image list I is not empty, the flow returns to step S905, and the above processing is repeated.

In step S910, a layout is formed and displayed by using the data received by the processing up to the point. For example, when the HTML data 301 shown in FIG. 3 is interpreted, the layout as shown in FIG. 6 is formed, displayed on the display unit 103 of the client 202, and thereby presented to the user.

The processing on the server 201 by which a response is returned to a request from the client 202 will be explained below.

Figure 13:
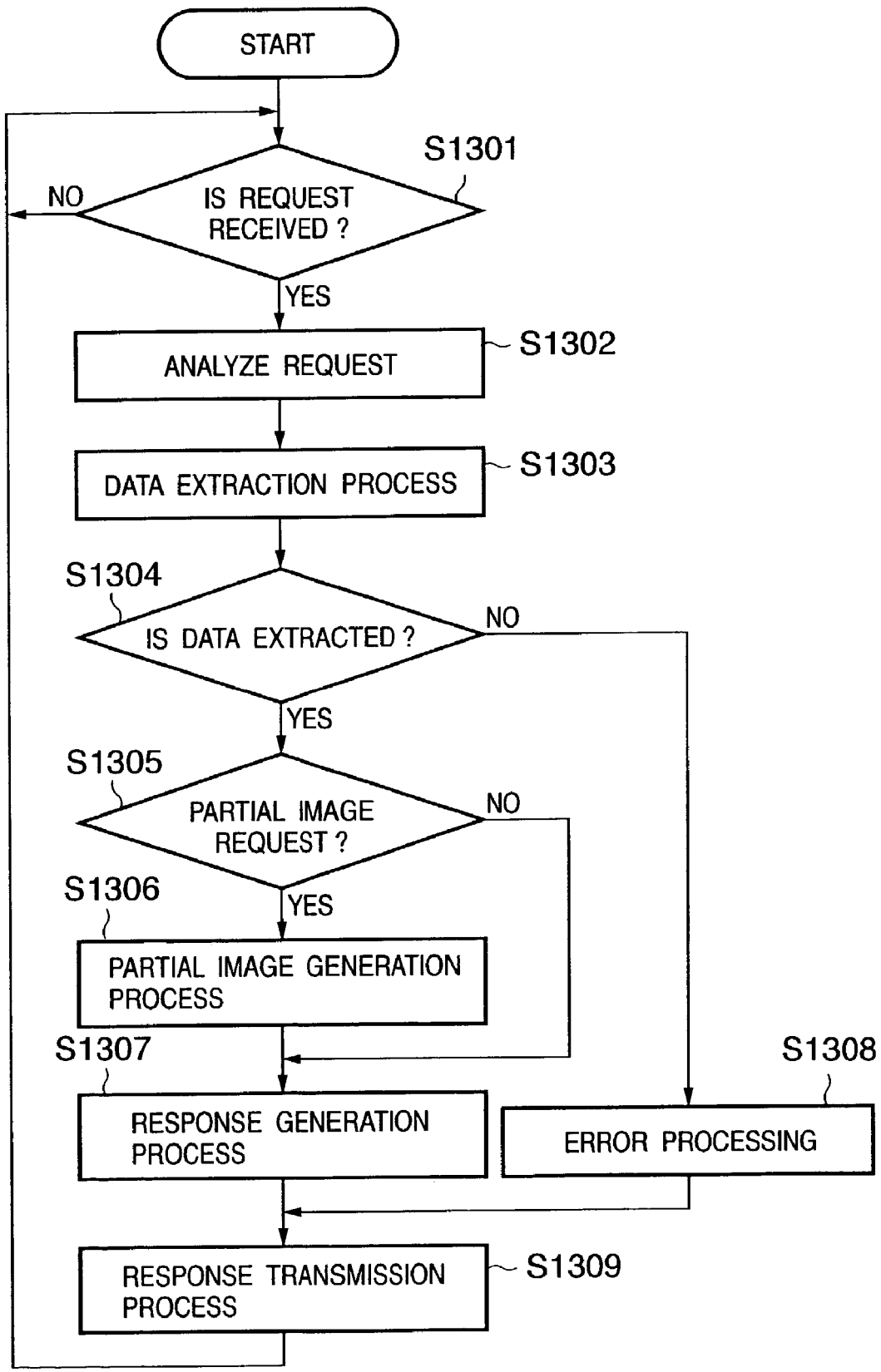
FIG. 13 is a flow chart showing processing on a server 201.

FIG. 13 is a flow chart showing the processing on the server 201. First, step S1301 is a loop for waiting for a request from the client 202. If a request from the client 202 arrives, the flow advances to step S1302 to analyze this request transmitted from the client 202.

In this embodiment, the request contains
Command ("GET")
Information concerning data (the path and identifier of data, or the path, identifier, and partial region information of data)
Protocol ("HTTP/1.0")

Therefore, these pieces of information are extracted from the request data. Furthermore, a character string of the information concerning the data is scanned to search for "?" from the head to the end of the character string. If "?" is found, a portion before "?" is saved as the file name, and a portion after "?" is stored as partial region information. If no "?" is found, the character string itself of the information concerning the data is saved as the file name.

Practical examples are as follows.

In the case of "GET pic1.jpg?left=0&top=0&bottom=40& right=160 HTTP/1.0",
Command: "GET"
Information concerning data:
    "pic1.jpg?left=0&top=0&bottom=40&right=160"
File name: "pic1.jpg"
Partial region information:
    "left=0&top=0&bottom=40&right=160"
Protocol: "HTTP/1.0"

In the case of "GET pic2.jpg HTTP/1.0",
Command: "GET"
Information concerning data: "pic2.jpg"
File name: "pic2.jpg"
Partial region information: ""
Protocol: "HTTP/1.0"

In step S1303, the data saved in the RAM 106 or storage unit 102 is searched for on the basis of the file name information obtained in step S1302. If the data file designated by the file name is not found, the flow advances from step S1304 to step S1308 to execute predetermined error processing.

If the designated data file is found, the flow advances to step S1305 to check whether the user's request is a partial image request. This processing is done by checking the file name information and the presence/absence of partial image information extracted in step S1302. If the data designated by the user is image data and partial image region information is present, the determination in step S1305 is true, so the flow advances to step S1306. If the data designated by the user is not image data or if no partial region information is present (empty character string), the determination in step S1305 is false, so the flow directly advances to step S1307.

Whether the requested data is an image can be checked by referring to the extension of the file to check whether the extension is, e.g., ".jpg" or ".gif" representing an image. This is reasonable because a well-known http server program called Apache also determines the type of file from the extension of the file. It is also possible to form a well-known database means to hold the correspondence between each file and type, and refer to the correspondence.

In step S1306, a partial image is generated in accordance with the user's designation. To obtain a partial image from the image data found in step S1303 on the basis of the partial region information obtained in step S1302, the image data is loaded and clipped. As described previously, In the case of "GET pic1.jpg?left=0&top=0&bottom=40& right=160 HTTP/1.0",
Command: "GET"
Information concerning data:
    "pic1.jpg?left=0&top=0&bottom=40&right=160"
File name: "pic1.jpg"
Partial region information:
    "left=0&top=0&bottom=40&right=160"
Protocol: "HTTP/1.0"
First, the character string
"pic1.jpg?left=0&top=0&bottom=40&right=160" of the partial region information is scanned. In this processing, four pairs of keywords and values, i.e., left=0
top=0
bottom=40
right=160 are obtained by regarding "&" as a delimiter. The designation of the region 502 shown in FIG. 8 is recognized by these keyword-value pairs, and the image data (JPG image data) indicated by pic1.jpg is decoded and loaded. The corresponding portion is extracted, and this extracted partial image region is held in the RAM 106 or storage unit 102 in a form which can be identified by the client. In this embodiment, the data is encoded by, e.g., the well-known JPEG coding system. The image extraction process and JPEG coding system can be a well-known process and system, respectively.

In step S1307, response data for the client 202 is generated. As indicated by 1102 in FIG. 11, MIME-Type is attached before this response data. This MIME-Type can be known from the extension of the file name if the request from the client 202 is not a partial image request, and from the data format of the partial image data held in step S1306 if the request is a partial image request. In the example explained in step S1306, the data is encoded by the JPEG coding system, so MIME-Type is image/jpeg. A response is generated by concatenating this MIME-Type and the data read out in step S1303 or the partial image data generated in step S1305, and returned to the client 202. The flow returns to step S1301 to wait for the next request from the client 202.

In this embodiment as described above, the communication amount can be reduced by transmitting and receiving only portions having influence on an image to be displayed. This increases the communication speed when the speed of the communication path 210 is low or when the amount of image data is very large. The embodiment has another advantage that when the connection time or data circulation amount of the communication path 210 is charged, the fee can be reduced. Furthermore, since the amount of data which the client saves to display can also be reduced. This is favorable if the capacity of the RAM or external storage of the client is limited.

In the above embodiment, one graphic object overlaps an image. However, this embodiment is of course readily applicable even when a plurality of graphic objects overlap an image.

Also, for an image which is completely covered with another graphic object, it is of course possible to transmit 0 partial image request, i.e., no partial image request.

In the above embodiment, multimedia data description formats are HTML and CSS. However, it is generally possible to apply another multimedia data description format which can describe a layout in which graphic objects partially overlap and which has image data as external reference. Accordingly, it is naturally possible to apply data or image data obtained by combining a style sheet such as CSS or XSL with XHTML, XML, SMIL (Synchronized Multimedia Integration Language, W3C Recommendation), or SVG (Scalable Vector Graphics 1.0 Specification, W3C Recommendation), to a page description language which can be externally referred to.

In the above embodiment, the data communication system is an http protocol. However, the embodiment can be realized on any arbitrary protocol by which the identifier of data designated by a client can be transmitted to a server, and response data from the server can be transmitted to the client. Therefore, another protocol such as FTP (File Transfer Protocol) or OBEX (IrDA Object Exchange Protocol) may also be used. When the FTP is used, information concerning an image region can be transmitted in the same manner as when the HTTP is used, and a server need only recognize the information. When the OBEX is used, a region for storing image region information is predetermined as a header, and the image region information is described in this header region. Alternatively, the image region information is described in the body of a request.

A protocol described in a URL may also be mapped in another protocol. For example, even when it is determined that external data reference in HTML data is reference by http, it is possible to convert this protocol into another protocol, e.g., OBEX, predetermined by a client, and perform communication between a server and the client by this OBEX.

Second Embodiment

The second embodiment according to the present invention will be described in detail below with reference to the accompanying drawings.

In the following description, only differences from the first embodiment will be explained. In the first embodiment, the user operates the image communication apparatus 202 to start processing by using the acquisition of HTML data from the image communication apparatus 201 as a trigger. However, the user can also operate the image communication apparatus 201 and transmit HTML data designated by the user to the image communication apparatus 202, thereby starting processing by using this transmission as a trigger.

Figure 14:
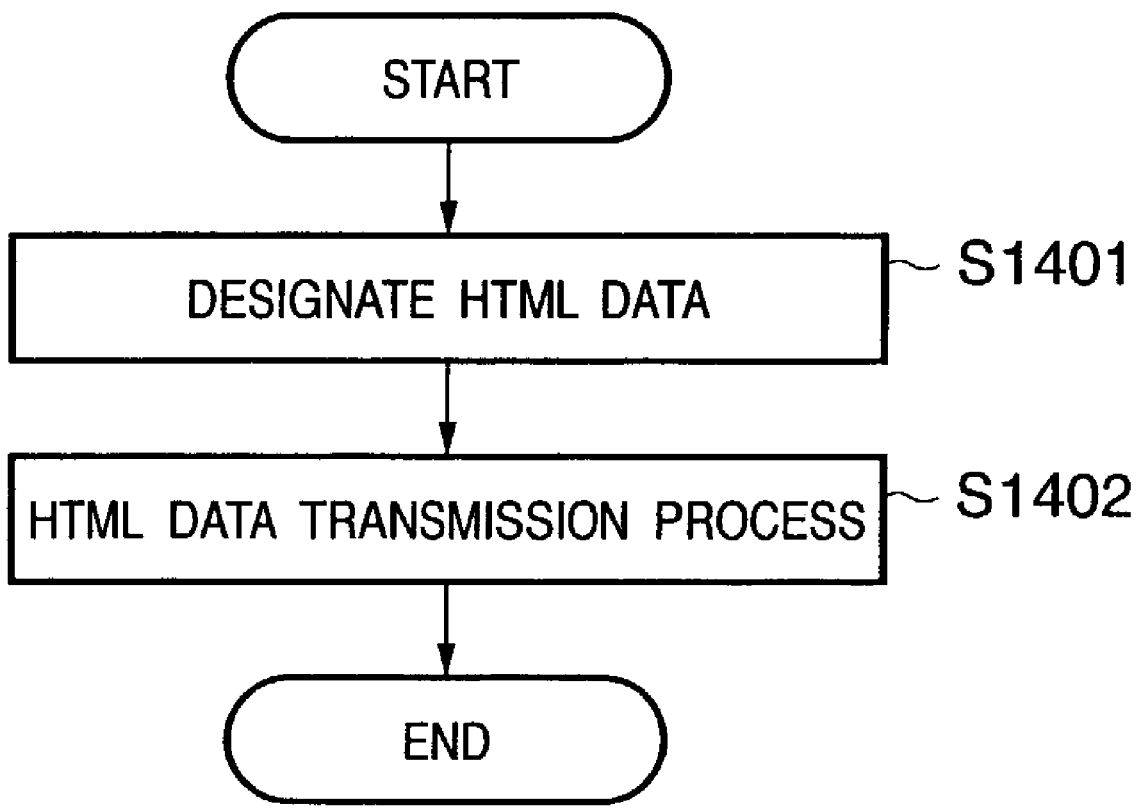
FIG. 14 is a flow chart showing a data transmission process on an image communication apparatus 201 according to the second embodiment.

FIG. 14 is a flow chart showing a data transmission process in an image communication apparatus 201. The user operates an input unit 101 of the image communication apparatus 201 to select HTML data to be transmitted to an image communication apparatus 202 (step S1401). As the method of selection, a file list may be displayed on a display unit 103 of the image communication apparatus 201 to allow the user to select one, or the user may use the input unit 101 to input an identifier (e.g., /path/to/data.html) representing HTML data 206 to be transmitted.

In step S1402, the data designated by the user in step S1401 is transmitted. The transmission method may be http or some other method such as FTP or OBEX. Furthermore, if a communication path 210 is capable of serial communication, parallel communication, or emulation of one of these communication-methods, the data maybe transferred following the corresponding procedure. Note that the transfer method in step S1402 need not be the same as the communication protocol for non-image data, image data, or partial image data explained in the first embodiment.

Figure 15:
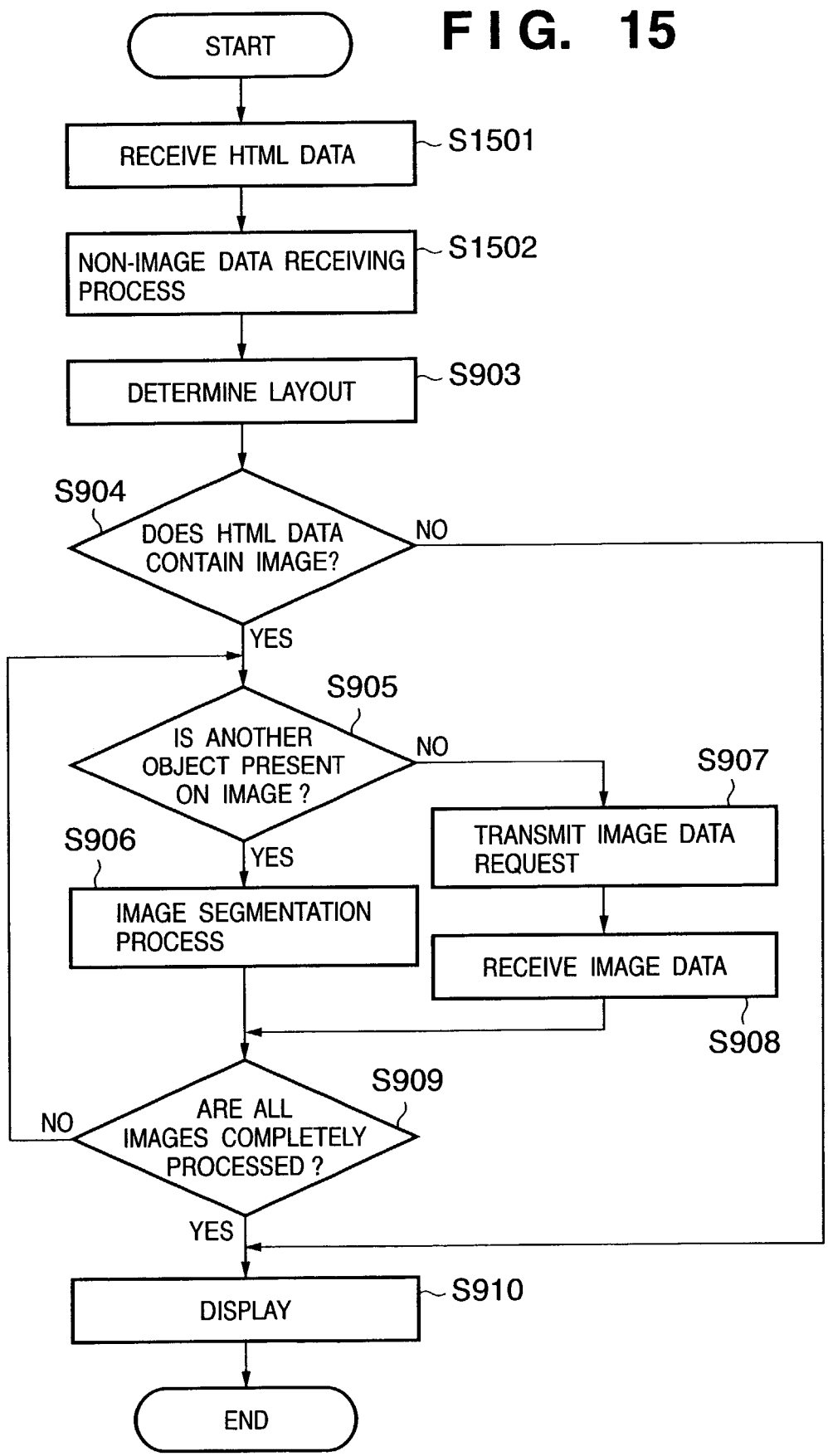
FIG. 15 is a flow chart showing processing on an image communication apparatus 202 according to the second embodiment.

FIG. 15 is a flow chart showing the processing on the image communication apparatus 202. In this processing, only steps S1501 and S1502 are different from steps S901 and S902 shown in FIG. 9 of the first embodiment. Therefore, the same reference numerals as in FIG. 9 denote the same processes, and an explanation thereof will be omitted.

First, in step S1501, HTML data transmitted by the image communication apparatus 201 is received and saved in a RAM 106 or storage unit 102. In step S1502, basically similar to step S902 in the first embodiment, the data is processed in accordance with the processing shown in FIG. 10. The difference from the first embodiment is that steps S1002 and S1003 shown in FIG. 10 are omitted, since these steps are unnecessary in the second embodiment.

The second embodiment is preferable when the image communication apparatus is a printer (in this case, the display unit 103 shown in FIG. 1 is a well-known printing device), and a printing request for a document described as HTML data is transmitted from the image communication apparatus 201 operated by the user.

Third Embodiment

The third embodiment according to the present invention will be described in detail below with reference to the accompanying drawings.

In the following description, only differences from the first and second embodiments will be explained. In the first and second embodiments, only regions necessary for layout are acquired. However, a system according to the third embodiment need not be so designed. In addition, although segmentation is performed such that the number of segmented regions is minimized in the first and second embodiments, the system according to the third embodiment need not be so designed.

For example, a well-known Flashpix image format ("Flashpix Specification 1.0", I3A) can hold an image having the same contents at a plurality of resolutions. In addition, each resolution image can be held as it is segmented into tiles each having 64×64 pixels, and partial image data can be accessed for each tile.

FIG. 16 is a view showing tile segmentation in the third embodiment. That is, FIG. 16 shows the state in which an image 1600 is segmented into a plurality of tiles 1601 to 1635.

Figure 17:
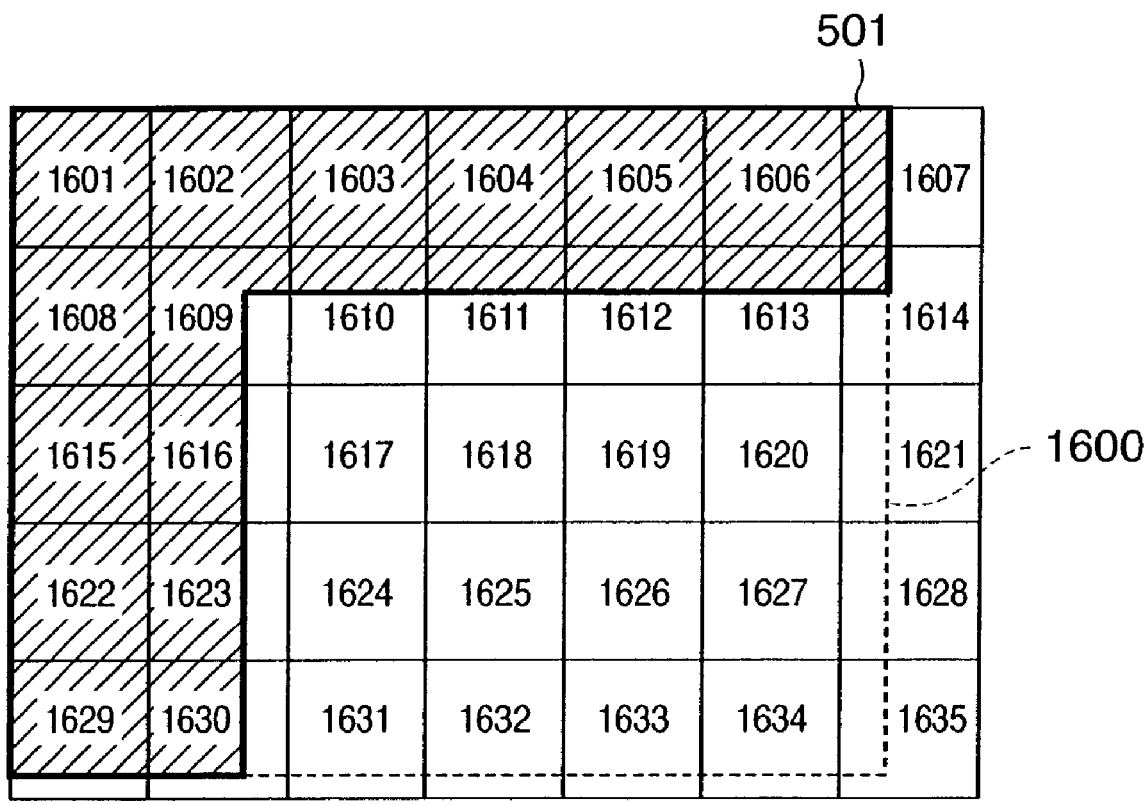
FIG. 17 is a view showing the relationship between a necessary image region as a result of layout shown in FIG. 4 and tile segmentation shown in FIG. 16.

FIG. 17 shows a layout obtained by the HTML data used in the first embodiment. Referring to FIG. 17, that portion (FIG. 4) of the image 402, which is not covered with the image 403, i.e., the region 501 shown in FIG. 5 is overlapped on FIG. 16.

Figure 18:
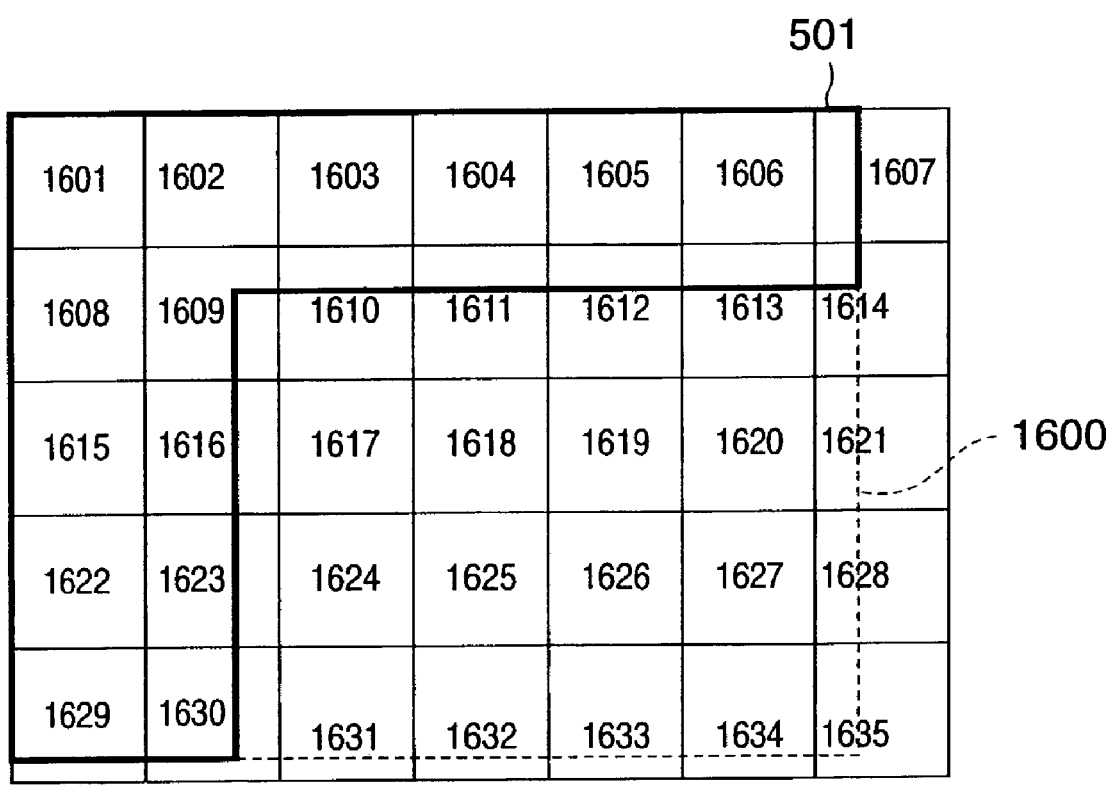
FIG. 18 is a view for explaining necessary tile images as a result of layout shown in FIG. 4.

Accordingly, when the image 402 in the lower portion of FIG. 4 is segmented into the tiles 1601 to 1635 as shown in FIG. 16, only the tiles 1601 to 1607, 1608 to 1614, 1615, 1616, 1622, 1623, 1629, and 1630 are necessary, and communication of the other tiles 1617 to 1621, 1624 to 1628, and 1631 to 1635 can be omitted, as shown in FIG. 18.

Especially when the image 1600 has the Flashpix format, a well-known IIP ("Internet Imaging Protocol version 1.06", Digital Imaging Group) can be applied to the communication procedure of partial image data acquisition between image communication apparatuses 201 and 202.

This IIP can transmit and receive Flashpix tile images and can also communicate information such as the width and height of a maximum-resolution image. In the layout determination process in step S903 of FIG. 9, therefore, a request for obtaining the width and height of an image is transmitted by using the IIP, and these values are obtained by referring to a response from the server. When this process is added, the embodiment can be applied even if the width or height attribute in the <img> tag of the HTML data 301 shown in FIG. 3 is omitted.

Figure 19:
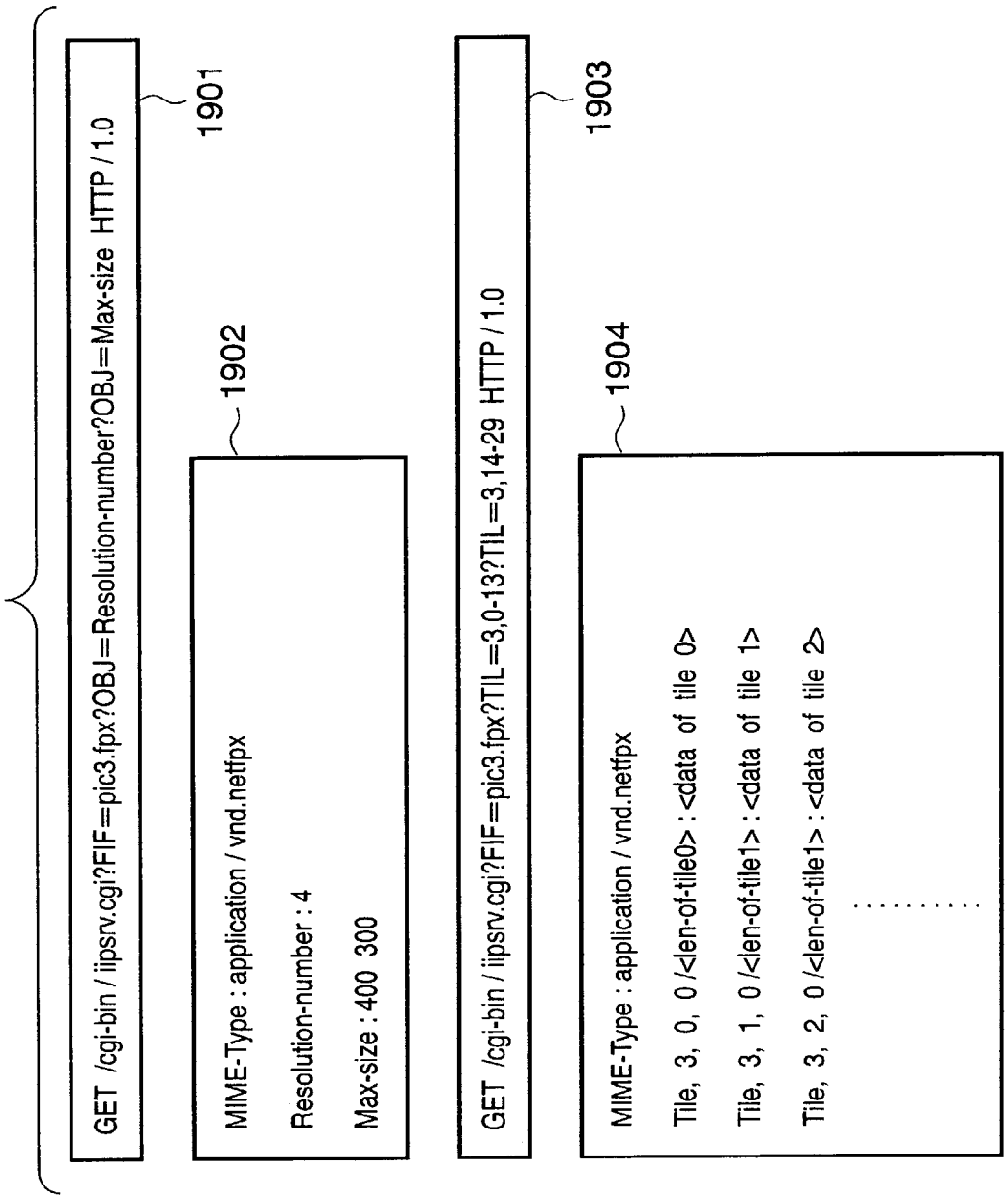
FIG. 19 is a view showing examples of a request and response by IIP.

FIG. 19 is a view showing examples of a request and response by the IIP. In FIG. 19, reference numeral 1901 denotes an example of a request for information concerning an image, which is transmitted to the image communication apparatus 201 by the image communication apparatus 202. This request 1901 and a request 1903 are examples when an IIP server program is constructed as CGI on an http server. A data field of the request 1901, i.e.,
/cgi-bin/iipsrv.cgi?FIF=pic3.fpx?
OBJ=Resolution-number?OBJ=Max-size is interpreted as it is further decomposed into
Path to IIP server (CGI): /cgi-bin/iipsrv.cgi
IIP command string:
FIF=pic3.fpx?OBJ=Resolution-number?OBJ=Max-size
Image file designation: FIF=pic3.fpx
Request for the number of hierarchical levels:
OBJ=Resolution-number
Request for the size of maximum-resolution image:
OBJ=Max-size In this example, the data is interpreted as an IIP server program requesting data of the number of hierarchical levels of a Flashpix image having a file identifier pic3.fpx, and the size (unit=pixel) of a maximum-resolution image.

In FIG. 19, reference numeral 1902 denotes an example of a response transmitted by the image communication apparatus 201 with respect to the request 1901. The first line of the response 1902 is MIME-Type representing an IIP response. The second line is data of the number of hierarchical levels. In this example, the number of hierarchical levels is 4. The third line indicates the size of a maximum-resolution image. In this example, the width is 400 pixels, and the height is 300 pixels.

Reference numeral 1903 denotes an example of a tile image transmission request which is transmitted to the image communication apparatus 201 by the image communication apparatus 202.

A data field of the request 1903, i.e.,
/cgi-bin/iipsrv.cgi?FIF=pic3.px?TIL=3,0–13? TIL=3, 14–29 is interpreted as it is further decomposed into
Path to IIP server (CGI): /cgi-bin/iipsrv.cgi
IIP command string:
/cgi-bin/iipsrv.cgi?FIF=pic3.fpx?TIL=3,0–13? TIL=3,14-29
Image file designation: FIF=pic3.fpx
Tile image request (1): TIL=3,0–13
Tile image request (2): TIL=3,14–29

In this example, the data is interpreted as tile image data (time image request (1)) within a range represented by tile number range 0–13 of hierarchical level number 3 (maximum resolution) of a Flashpix image having a file identifier pic3.fpx, and as tile image data (tile image request (2)) within a range represented by tile number range 14–29 of hierarchical level number 3.

FIG. 20 is a view for explaining the correspondence between the tile number range and tile. An explanation will be made by using the image 1600 shown in FIG. 16. Referring to FIG. 20, a number given to each tile image is a tile number in the IIP. In the IIP, tile numbers starting from 0 are given rightward and downward from the upper left corner. Reference numeral 2011 denotes a tile image within the range represented by tile number range 0 to 13; and 2012, a tile image represented by tile number range 14–29. As is apparent from the tile image 2012, a tile number range in the IIP does not represent the range of a sequence; a tile number range is represented by connecting the upper left tile number and the lower right tile number of a rectangular region by "-".

Referring back to FIG. 19, reference numeral 1904 denotes an example of a response from the image communication apparatus 201 to the request 1903. The first line of the response 1904 is MIME-Type representing an IIP response. The second and subsequent lines are data of individual tile images. For example, the second line represents data of tile number 0 of hierarchical level number 3. Actual tile image data of tile number 0 is stored in <data of tile 0>, and the data length of this tile image data stored in <data of tile 0> is stored in <len-of-tile 0>. Likewise, the third line represents data of tile number 1 of hierarchical level number 3, and the fourth line represents data of tile number 2 of hierarchical level number 3.

The image communication apparatus 202 which has received the response 1904 interprets the response 1904 as described above, and extracts the data to prepare for drawing.

In addition, the well-known JPEG2000 image format (ISO/IEC 15444-1 ITUTT.800 "JPEG 2000 IMAGE CODING SYSTEM") can also hold image data having a plurality of resolutions in the form of differences and segment the image data into tile images. Therefore, similar to Flashpix, this format can also be applied to the system of this embodiment.

Although there is no communication protocol dedicated to the JPEG2000 image format such as the IIP for the Flashpix image format, the same processing as for the IIP request explained earlier need only be performed. However, unlike Flashpix, tile segmentation in JPEG2000 is determined by parameters during encoding. For example, therefore, a command such as OBJ=Tilesize is added to the request 1901, and the image communication apparatus 201 which has received this request analyzes the designated JPEG2000 image format data. The image communication apparatus 201 specifies the size (width and height) of a tile having the maximum resolution by referring to XTsiz, YTsiz, XTOsiz, and YTOsiz fields in the SIZ marker of Main Header. For example, the image communication apparatus 201 returns Tile-size: <tile width><tile height> as the response 1902. On the basis of the obtained tile size at the maximum resolution, the number of hierarchical levels, and the image size at the maximum resolution, the client specifies a tile necessary for the target hierarchical image, and requests the tile image accordingly.

As in the well-known system of U.S. Pat. No. 6,041,143, in response to a partial image request from the image communication apparatus 202, it is also possible to generate JPEG2000 image data corresponding to the partial region from partial data of JPEG2000 image data by the image communication apparatus 201, and transmit the generated image data to the image communication apparatus 202.

When image data has a JPEG image format, as described in, e.g., well-known Japanese Patent Laid-Open No. 05-207259, it is possible to perform image extraction by a JPEG MCU (Minimum Coding Unit) with respect to a partial region request, add information representing the region requested by the image communication apparatus 202 to re-encode the image into a JPEG image format, and transmit the partial image data to the image communication apparatus 202.

Furthermore, when image data has a JPEG image format, it is possible to change the partial region request, when the image communication apparatus 202 determines segmentation, such that the image is segmented by the MCU in one or both of the horizontal and vertical directions, and transmit the data to the image communication apparatus 201.

Also, if partial image request or partial image generation is done by the MCU when image data has a JPEG image format, the JPEG image need not be completely decoded during partial image generation but can be segmented in the form of DCT coefficients after Huffman codes are decoded. Therefore, inverse DCT and DCT processes can be omitted, so the speed of the partial image generation process can be increased compared to the first embodiment. In addition, since operation errors caused by inverse DCT and DCT can be reduced, image deterioration caused by re-encoding can also be reduced.

In the system according to the third embodiment as explained above, unlike in the first embodiment, it is unnecessary to request only a portion having influence on the layout by segmenting the portion into a minimum number of regions.

The third embodiment suitably operates for an image format by which an image to be segmented into rectangles is held as it is segmented into rectangles beforehand.

Fourth Embodiment

The fourth embodiment according to the present invention will be described in detail below with reference to the accompanying drawings.

In the following description, only differences from the first, second, and third embodiments will be explained. In the first and second embodiments, overlapping is checked by using a rectangle as another graphic object. In the system according to the fourth embodiment, the shape of a graphic object is not limited to a rectangle. For example, SVG can designate a graphic object having any arbitrary shape.

Figure 21:
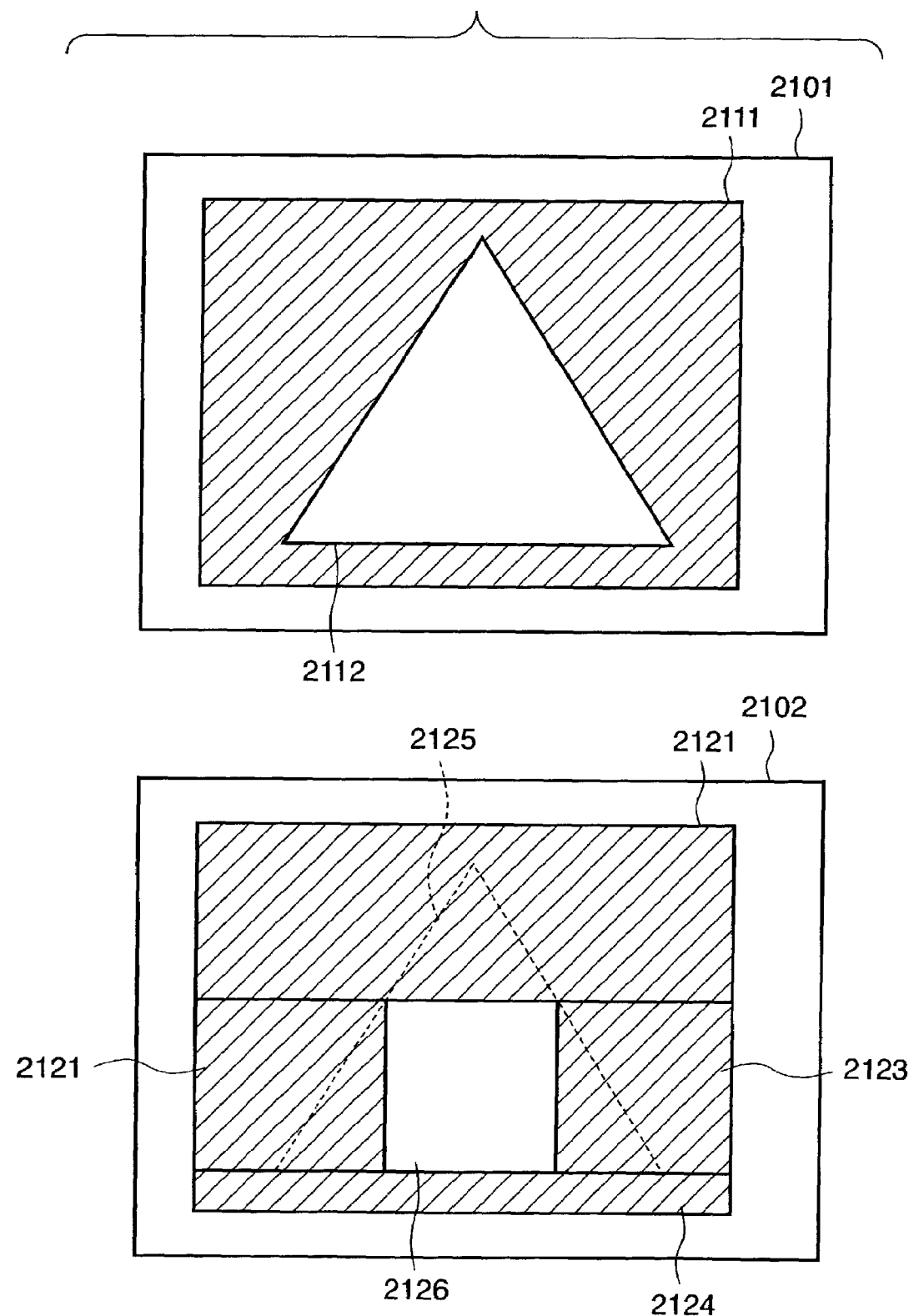
FIG. 21 is a view showing the state in which a non-rectangular, non-transmitting graphic object overlaps an image region according to the fourth embodiment.

FIG. 21 is a view showing the state in which a non-rectangular, non-transparent graphic object overlaps an image region. In 2101 shown in FIG. 21, a triangular graphic object 2112 overlaps an image 2111. In this case, the image can be segmented into rectangles as indicated by 2102. That is, in 2102, reference numerals 2121 to 2124 denote partial image regions segmented into rectangles, and a broken line 2125 represents the contour of the triangular graphic object 2112. A region 2126 indicates an image region whose transfer is omitted by this processing.

The contour 2125 is obtained when, e.g., the multimedia data description form is interpreted by the layout determination process in step S903 of FIG. 9. Therefore, segmentation into rectangles need only be performed as shown in FIG. 21 by the image segmentation process in step S906 in accordance with the contour information.

Note that segmentation into rectangles indicated by 2102 in FIG. 21 is merely an example, so another method may also be used as long as each partial image region is a rectangle. In addition, each partial image region may also be further segmented to increase the area of the region whose transfer is omitted.

The method is also applicable when graphic object data having image transparent information overlaps another image data.

Figure 22:
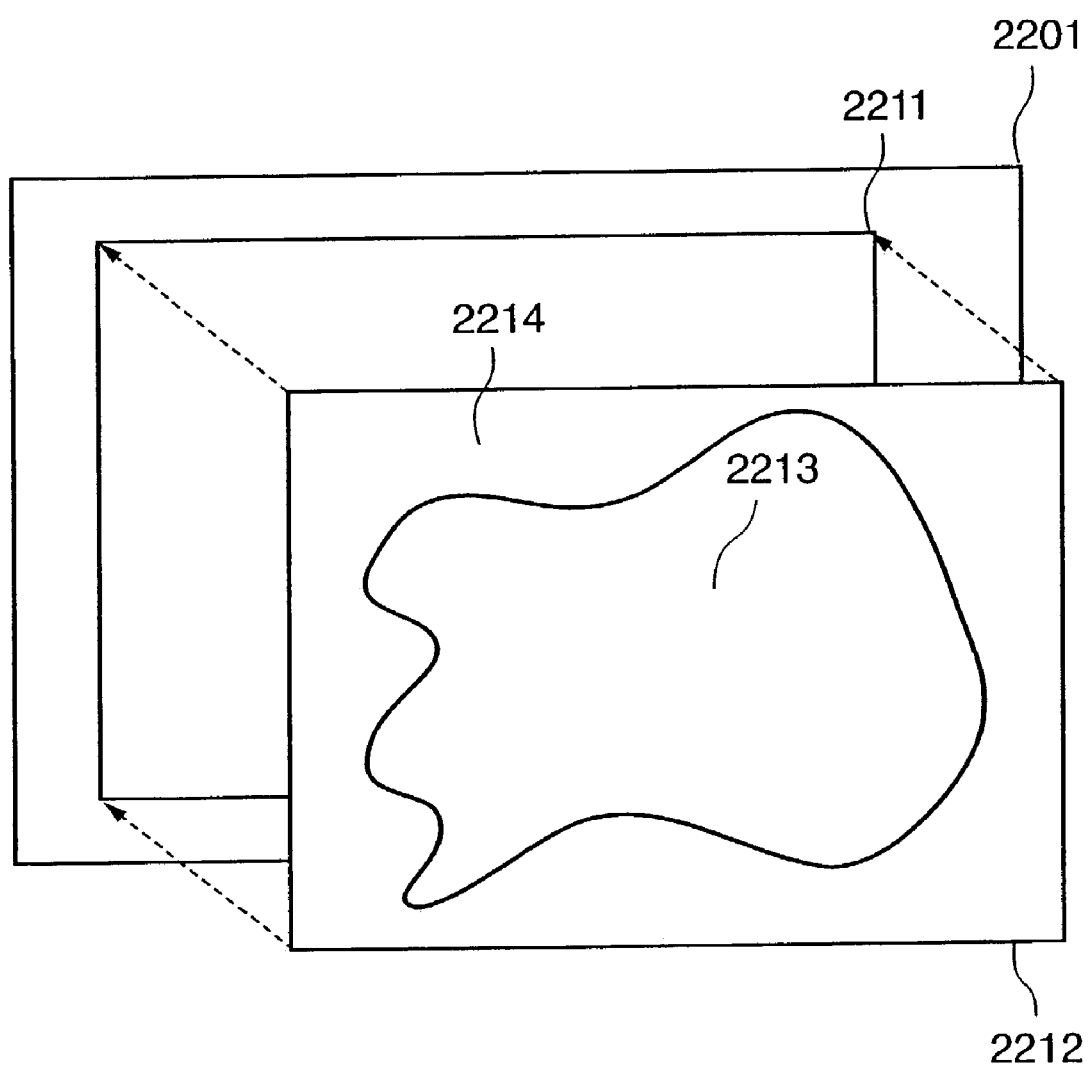
FIG. 22 is a view for explaining a layout in which a graphic object having transparent information is overlapped on an image.

FIG. 22 is a view for explaining a layout in which a graphic object having transparent information overlaps an image. In FIG. 22, reference numeral 2201 denotes the drawing area of a multimedia data interpreter (browser); 2211, an underlying image; and 2212, an overlying image. The image 2212 has transparent information like that in a well-known PNG format (Portable Network Graphics, W3C Recommendation) or a well-known GIF89A format. Reference numeral 2213 denotes a region of pixels designated to be transparent; and 2214, a region of non-transparent pixels.

Figure 23:
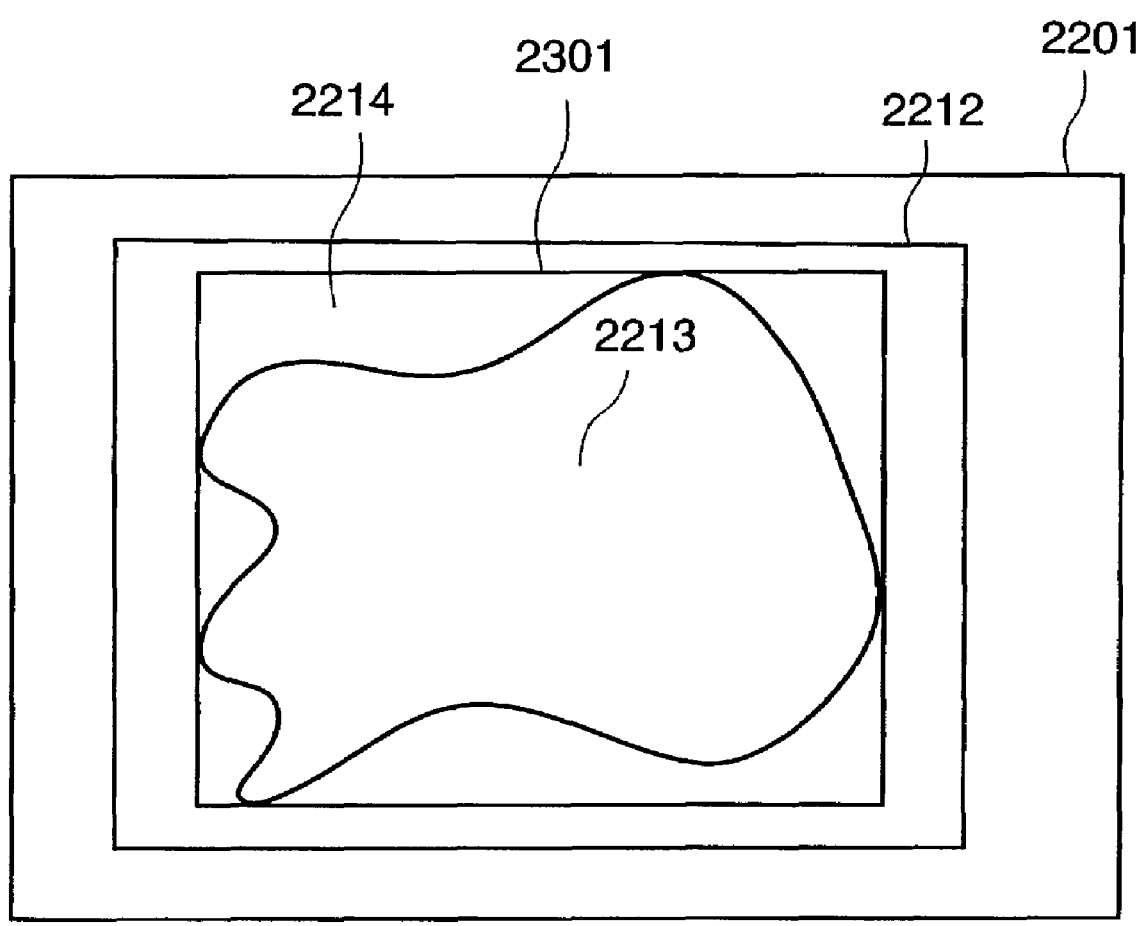
FIG. 23 is a view showing the state in which images 2211 and 2212 shown in FIG. 22 are overlapped.

FIG. 23 is a view showing the state in which the images 2211 and 2212 shown in FIG. 22 are overlapped. In FIG. 23, the same reference numerals as in FIG. 22 denote the same elements.

In FIG. 23, reference numeral 2301 denotes a circumscribed rectangle of the transparent region 2213. As shown in FIG. 23, only the rectangular region 2301 is necessary for the underlying image 2211. To form the layout shown in FIG. 23, therefore, it is only necessary to transmit the identifier of the image 2211 and the information of the rectangular region 2301, and obtain a partial image of the image 2211.

The rectangular region 2301 can be obtained by acquiring the image 2212 and checking the positions of pixels designated to be transparent, before the image 2211 or its partial image is acquired. This can be done by sequentially scanning the individual pixels, and checking the maximum and minimum values of the x-coordinates and the maximum and minimum values of the y-coordinates of the pixels designated to be transparent in the coordinate space as defined in FIG. 8.

The image 2211 may also be segmented more finely so as not to contain the region 2213. Alternatively, if an image is segmented into tiles beforehand as in the second embodiment, the image 2211 may be segmented accordingly.

Conversely, if a region 2213 is non-transparent and a region 2214 is transparent, the transmission of a partial image not containing the region 2214 can be omitted, by segmenting the image 2211 and by transmitting only a partial image containing a partial of the region 2214.

As described above, the present invention is also applicable even when a non-rectangular graphic object or a graphic object having transparent information overlaps an image.

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a recoding medium recording program codes of software for implementing the functions of the above embodiments to a system or apparatus, and reading out and executing the program codes stored in the recording medium by a computer (or a CPU or MPU) of the system or apparatus.

In this case, the program codes read out from the recording medium implement the functions of the present invention, and the recording medium recording these program codes constitutes the invention.

As this recording medium for supplying the program codes, it is possible to use, e.g., a flexible disk, hard disk, optical disk, magnetooptical disk, CD-ROM, CD-R, magnetic tape, nonvolatile memory card, and ROM.

Also, besides the functions of the above embodiments are implemented by executing the readout program codes by the computer, the present invention includes a case where an operating system (OS) or the like running on the computer performs part or the whole of actual processing in accordance with designations by the program codes and thereby implements the functions of the above embodiments.

Furthermore, the present invention also includes a case where the program codes read out from the recording medium are written in a memory of a function expansion board inserted into the computer or of a function expansion unit connected to the computer, and, in accordance with designations by the program codes, a CPU or the like of the function expansion board or function expansion unit performs part or the whole of actual processing and thereby implements the functions of the above embodiments.

As has been explained above, the present invention can reduce the communication amount and communication time by neither transmitting nor receiving image data of an overlapped portion of graphic objects described in multimedia description data.

The present invention is not limited to the above embodiments and various changes and modifications can be made within the spirit and scope of the present invention. Therefore, to apprise the public of the scope of the present invention, the following claims are made.

What is claimed is:

1. An image requesting apparatus comprising:
   determining means for determining overlapping of one of a plurality of images and another image; and
   transmitting means for transmitting, to an image storage device, a first request for requesting image data corresponding to an image found to be not overlapped with said another image by said determining means, and transmitting, to said image storage device, a second request for requesting partial image data corresponding to not less than one partial image of an image found to be overlapped with said another image.

2. The apparatus according to claim 1, further comprising:
   designating means by which a user designates multimedia description data held in said image storage device; and
   receiving means for transmitting a request for the designated multimedia description data, and receiving the multimedia description data returned in response to the request.

3. The apparatus according to claim 1, further comprising receiving means for receiving multimedia description data designated on said image storage device by a user.

4. The apparatus according to claim 1, wherein the multimedia description data is described in at least one of HTML, XHTML, XML, SVG, and SMIL.

5. The apparatus according to claim 1, wherein the request for the partial image data contains at least an identifier of the image and region information of the image.

6. The apparatus according to claim 5, wherein the region information of the image contains coordinate values of two points on a coordinate system defined by the image.

7. The apparatus according to claim 5, wherein the region information of the image contains coordinate values, width, and height of one point on a coordinate system defined by the image.

8. The apparatus according to claim 5, wherein the region information of the image contains coordinate values of one point on a coordinate system defined by the image, one of a width and height, and a ratio of the width to the height.

9. The apparatus according to claim 1, wherein the image data has an image format which holds an entire image by segmenting the image into rectangular regions beforehand, and region information of the image is an identifier of each rectangular region.

10. The apparatus according to claim 1, further comprising metadata receiving means for transmitting, to said image storage device, a request for metadata concerning image data when a layout is determined, and receiving the metadata returned in response to the request.

11. The apparatus according to claim 10, wherein the metadata concerning the image data contains at least information sufficient to determine a width and height of an image.

12. The apparatus according to claim 11, wherein the information sufficient to determine the width and height of an image is the number of pixels in a horizontal direction and the number of pixels in a vertical direction of the image.

13. The apparatus according to claim 11, wherein the information sufficient to determine the width and height of an image is one of the number of pixels in a horizontal direction and the number of pixels in a vertical direction of the image, and a ratio of the number of pixels in the horizontal direction to the number of pixels in the vertical direction.

14. The apparatus according to claim 11, wherein the metadata concerning the image data is information containing at least the number of hierarchical levels of an image and a size of a maximum-resolution image.

15. A program embodied in an apparatus-readable medium for allowing an apparatus to execute steps of an image requesting method, the image requesting method comprising:
an overlap determination step of determining overlap of a plurality of images and another image;
a transmission step of transmitting, to an image storage device, a first request for requesting image data corresponding to an image found to be not overlapped with said another image by said overlap determination step, and transmitting, to said image storage device, a second request for requesting partial image data corresponding to not less than one partial image of an image found to be overlapped with said another image.

16. A computer-readable recording medium recording a program cited in claim 15.

17. An image communication system in which a server apparatus holding a plurality of images and a client apparatus communicate with each other via a communication path, comprising:
said server apparatus comprising:
image transmitting means for receiving a request for image data corresponding to an image or partial image data corresponding to a partial image, and transmitting the image data or partial image data requested in response to the request, and
said client apparatus comprising:
overlap determining means for determining overlapping of one of a plurality of images and another image; and
transmitting means for transmitting, to an image storage device, a first request for requesting image data corresponding to an image found to be not overlapped with said another image by said determining means, and transmitting, to said image storage device, a second request for requesting partial image data corresponding to not less than one partial image of an image found to be overlapped with said another image.

18. The apparatus according to claim 1, wherein said determining means determines overlapping of the one of the plurality of images and another image described in multimedia description data received from said image storage device.

19. An image requesting method comprising the steps of:
determining overlap of a plurality of images and another image; and
transmitting, to an image storage device, a first request for requesting image data corresponding to an image found to be not overlapped with said another image by said determining step, and transmitting, to said image storage device, a second request for requesting partial image data corresponding to not less than one partial image of an image found to be overlapped with said another image.

20. The method according to claim 19, further comprising the steps of:
designating, by which a user designates multimedia description data held in said image storage device;
transmitting a request for the designated multimedia description data; and
receiving the multimedia description data returned in response to the request.

21. The method according to claim 19, further comprising a step of receiving multimedia description data designated on said image storage device by a user.

22. The method according to claim 19, wherein the request for the partial image data contains at least an identifier of the image and region information of the image.

23. The method according to claim 19, wherein the image data has an image format which holds an entire image by segmenting the image into rectangular regions beforehand, and region information of the image is an identifier of each rectangular region.

24. The method according to claim 19, further comprising a step of transmitting, to said image storage device, a request for metadata concerning image data when a layout is determine, and receiving the metadata returned in response to the request.

25. The method according to claim 19, wherein said determining step determines overlapping of the one of the plurality of images and another image described in multimedia description data received from said image storage device.

* * * * *

UNITED STATES PATENT AND TRADEMARK OFFICE
CERTIFICATE OF CORRECTION

PATENT NO.        : 7,167,603 B2                                        Page 1 of 1
APPLICATION NO.   : 10/408565
DATED             : January 23, 2007
INVENTOR(S)       : Yasuo Fukuda It is certified that error appears in the above-identified patent and that said Letters Patent is hereby corrected as shown below:

COLUMN 6:
Line 50, "Referred" should read --Referred to--.

COLUMN 9:
Line 52, "compete" should read --complete--.

COLUMN 10:
Line 63, "HTTP/41.0" should read --HTTP/1.0--.

COLUMN 14:
Line 46, "communication-methods" should read --communication methods--, and "maybe" should read --may be--.

COLUMN 22:
Line 37, "mine," should read --mined,--.

Signed and Sealed this

Thirtieth Day of October, 2007

JON W. DUDAS
*Director of the United States Patent and Trademark Office*